(12) United States Patent
Spannbauer et al.

(10) Patent No.: US 11,591,946 B1
(45) Date of Patent: Feb. 28, 2023

(54) SYSTEM FOR THERMAL MANAGEMENT OF ENGINE EXHAUST

(71) Applicant: Ford Global Technologies, LLC, Dearborn, MI (US)

(72) Inventors: Shawn Spannbauer, Royal Oak, MI (US); Eric Matthew Kurtz, Dearborn, MI (US); Stephen George Russ, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/653,609

(22) Filed: Mar. 4, 2022

(51) Int. Cl.
*F01N 3/20* (2006.01)
*F01N 3/32* (2006.01)
(Continued)

(52) U.S. Cl.
CPC ......... *F01N 3/208* (2013.01); *B01D 53/9431* (2013.01); *B01D 53/9495* (2013.01);
(Continued)

(58) Field of Classification Search
CPC .......... F01N 3/208; F01N 3/323; F01N 3/326; F01N 3/2066; F01N 2900/1404; B01D 53/9431; B01D 53/9495; F02B 29/04; F02B 37/004; F02B 37/18; F02B 37/183; Y02T 10/12; Y02T 10/40

See application file for complete search history.

(56) References Cited

U.S. PATENT DOCUMENTS 7,597,081 B2 10/2009 Aw
8,683,786 B2 4/2014 Ruona et al.
(Continued)

FOREIGN PATENT DOCUMENTS

EP 3441587 A1 2/2019
JP 2011052611 A 3/2011
WO 2013095214 A1 6/2013

OTHER PUBLICATIONS

Holderbaum, B., "RDE Challenges Existing Aftertreatment Technology," Automotive IQ Website, Available Online at https://www.automotive-iq.com/exhaust/interviews/rde-challenges-existing-aftertreatment-technology, Mar. 14, 2014, 5 pages.

*Primary Examiner* — Audrey B. Walter
*Assistant Examiner* — Dapinder Singh
(74) *Attorney, Agent, or Firm* — Vincent Mastrogiacomo; McCoy Russell LLP

(57) ABSTRACT

Methods and systems are provided for maintaining a temperature of exhaust gases of an engine within a temperature range at which catalytic conversion is most efficient. In one example, a method for controlling a temperature of exhaust gases entering a Selective Catalytic Reduction (SCR) system for an engine comprises delivering pressurized air into the exhaust gases upstream of the SCR system, the pressurized air cooled by an air cooler; and adjusting a degree of pressurization by adjusting operation of a turbocharger pressurizing the pressurized air. In one embodiment, the air cooler may be a charge air cooler of a primary turbocharger of the engine, which may flow pressurized air both to the engine and to the SCR system. In other embodiments, the air may be pressurized by an air pump or a secondary dilution turbocharger, and cooled by a secondary charge air cooler.

20 Claims, 9 Drawing Sheets

(51) Int. Cl.
  *F02B 29/04* (2006.01)
  *F02B 37/00* (2006.01)
  *B01D 53/94* (2006.01)
  *F02B 37/18* (2006.01)

(52) U.S. Cl.
  CPC ............ *F01N 3/323* (2013.01); *F01N 3/326* (2013.01); *F02B 29/04* (2013.01); *F02B 37/004* (2013.01); *F02B 37/183* (2013.01); *F01N 2900/1404* (2013.01)

(56) References Cited

U.S. PATENT DOCUMENTS

| | | |
|---|---|---|
| 8,997,461 B2 | 4/2015 | Henry et al. |
| 9,057,302 B2 | 6/2015 | Yacoub |
| 9,255,508 B2 | 2/2016 | Yacoub |
| 9,376,949 B2 | 6/2016 | Gandhi et al. |
| 2013/0312391 A1* | 11/2013 | Cavataio ................. F01N 3/225 60/287 |
| 2018/0073407 A1* | 3/2018 | Hogan .................... F01N 3/206 |
| 2019/0195106 A1* | 6/2019 | Faizi ...................... F01N 3/208 |
| 2019/0360376 A9* | 11/2019 | Schickler ........... B01D 53/9477 |
| 2020/0271046 A1* | 8/2020 | Kelly ..................... F02B 37/10 |

* cited by examiner

SYSTEM FOR THERMAL MANAGEMENT OF ENGINE EXHAUST

FIELD

The present description relates generally to an exhaust system of a diesel engine, and in particular, to a Selective Catalytic Reduction (SCR) system of the exhaust system.

BACKGROUND/SUMMARY

Modern emissions standards for diesel engines may limit full-load tailpipe oxides of nitrogen (NOx) emissions levels. A diesel engine may be equipped with a Selective Catalytic Reduction (SCR) system disposed in an exhaust passage of the engine, which may capture or convert the NOx to nitrogen and water. An SCR system may exhibit high conversion efficiency within a relatively narrow temperature window. When an operating temperature of exhaust gases flowing through an SCR system is outside of the temperature window, conversion efficiency may be lower than desired. For example, SCR systems may rapidly lose conversion efficiency above a maximum threshold temperature (e.g., 450° C.). Additionally, other techniques used to reduce NOx emissions, such as exhaust gas recirculation (EGR), may increase exhaust temperatures, resulting in a further decrease in conversion efficiency.

Prior solutions to maintaining a temperature of the exhaust gas within a desirable temperature range for an SCR system (e.g., below the maximum threshold temperature) include derating a torque and power of the diesel engine when the temperature exceeds the maximum threshold temperature. Alternatively, a size of a turbocharger of the engine may be increased to increase a flow of air through the engine, thereby diluting the exhaust gases. However, the inventors herein have recognized potential issues with these methods. In particular, derating the diesel engine may impose a significant limitation on a full-load performance output of an engine, which is an important attribute for a vehicle including the engine. Similarly, increasing the size of the turbocharger may lead to excessive peak cylinder pressure, which may negatively affect performance for structural durability reasons.

In one example, the issue described above may be addressed by method for controlling a temperature of exhaust gases entering an SCR system for an engine, comprising delivering pressurized air into the exhaust gases upstream of the SCR system, the pressurized air cooled by an air cooler; and adjusting a degree of pressurization by adjusting operation of a turbocharger pressurizing the pressurized air. In a first embodiment, the pressurized air may be cooled by a charge air cooler of a primary turbocharger of the engine, which may flow pressurized air both to the engine and to the SCR system. In a second embodiment, the air may alternatively be pressurized by an air pump mechanically coupled to the engine or powered by a battery, and cooled by a secondary charge air cooler. In a third embodiment, the air may be pressurized by a dilution compressor of a secondary dilution turbocharger, where the dilution compressor is driven by a flow of the exhaust gases through a dilution turbine of the secondary dilution turbocharger prior to entering the SCR system. By routing the exhaust gases through the dilution turbine, enthalpy may be extracted from the exhaust gas to reduce the temperature of the exhaust gas. By controlling an amount of the exhaust gases routed through the dilution turbine, an amount of pressurized air injected into the exhaust gases may be controlled to maintain the exhaust gases within a temperature range where an efficiency of an SCR system may be maximized, thereby reducing an emissions of the vehicle. A further advantage of the embodiments described herein is that the primary turbocharger, the secondary dilution turbocharger, and/or the air pump may be powered by the engine and/or excess energy already present in the exhaust gas, whereby a secondary energy source may not be relied on.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

DETAILED DESCRIPTION

Figure 1:
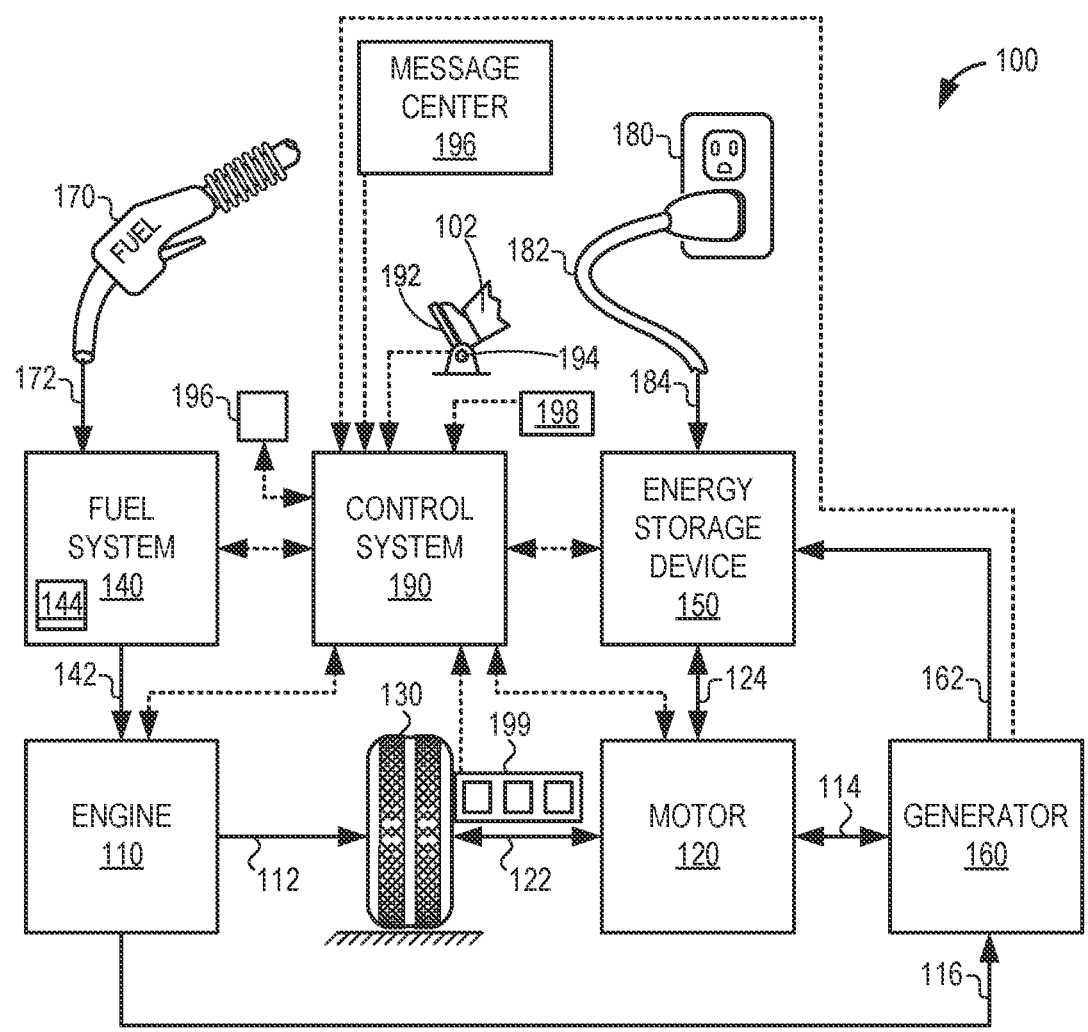
FIG. 1 shows an example hybrid vehicle propulsion system.
Figure 2:
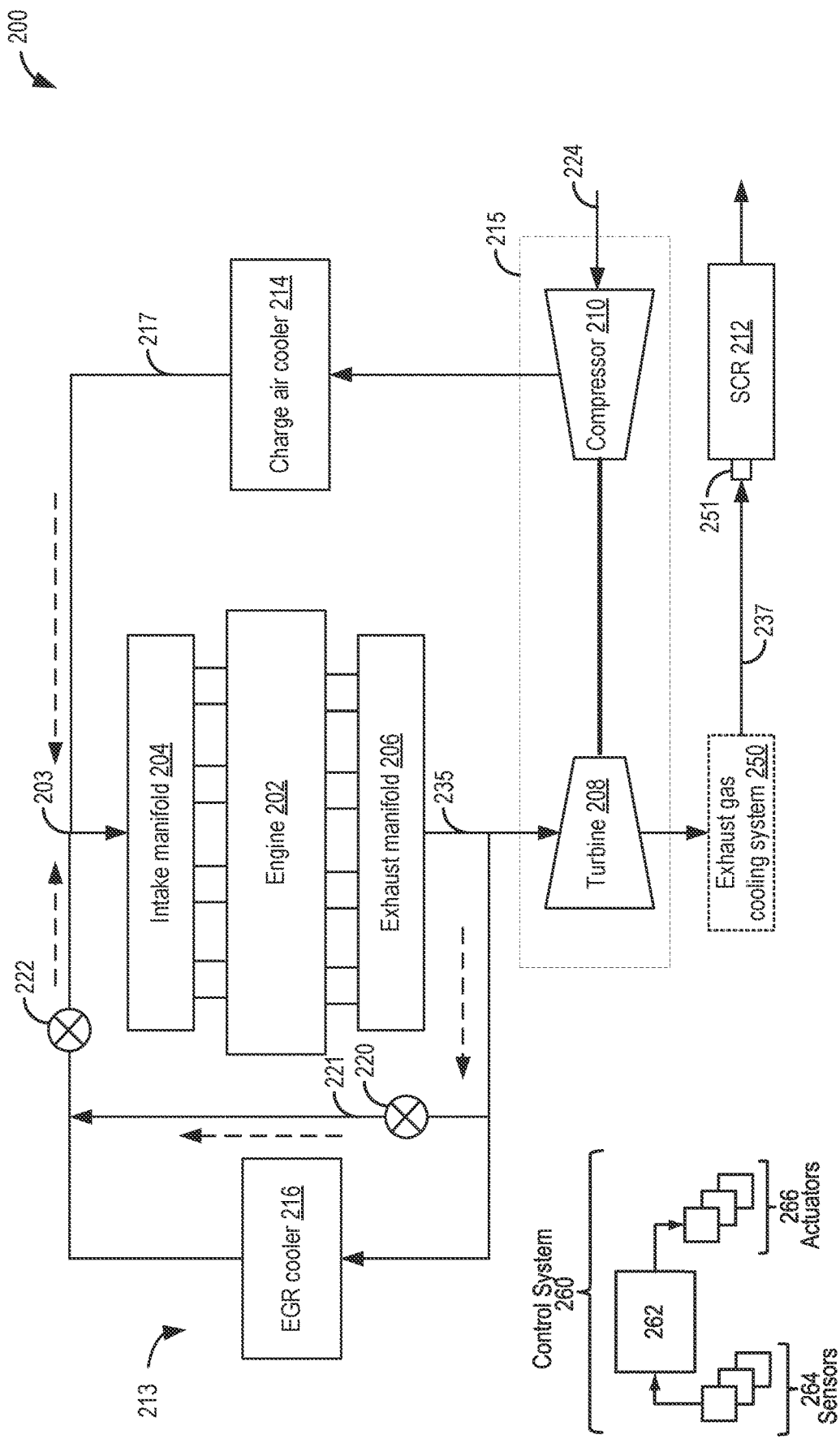
FIG. 2 shows an example vehicle engine system including an exhaust gas cooling system.
Figure 3A:
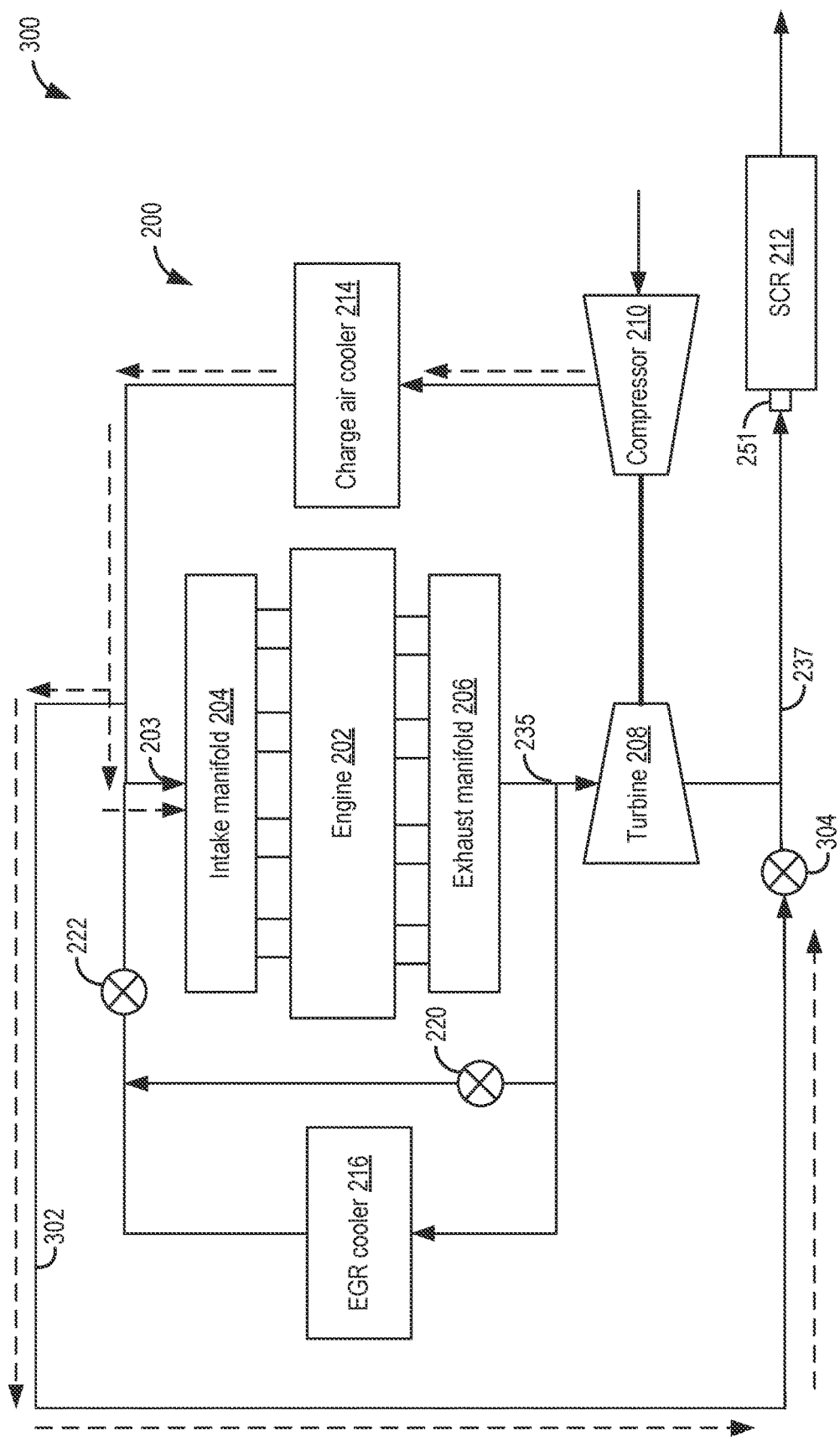
FIG. 3A shows the vehicle engine system of FIG. 2, where pressurized air from a primary turbocharger of the engine system is used to cool the exhaust gases.
Figure 3B:
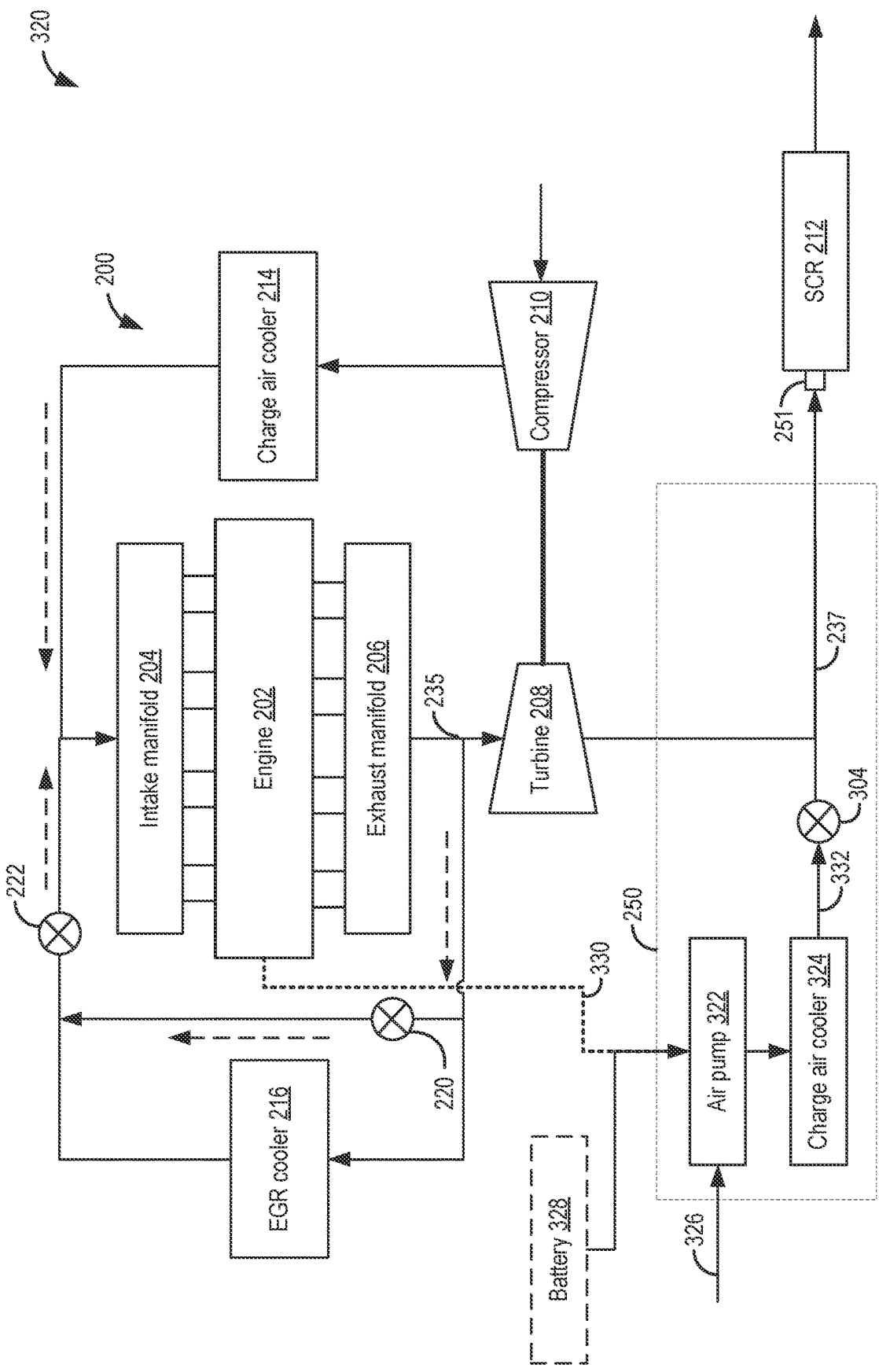
FIG. 3B shows the vehicle engine system of FIG. 2, where the exhaust gas cooling system includes an air pump that flows pressurized air into the exhaust gases.
Figure 3C:
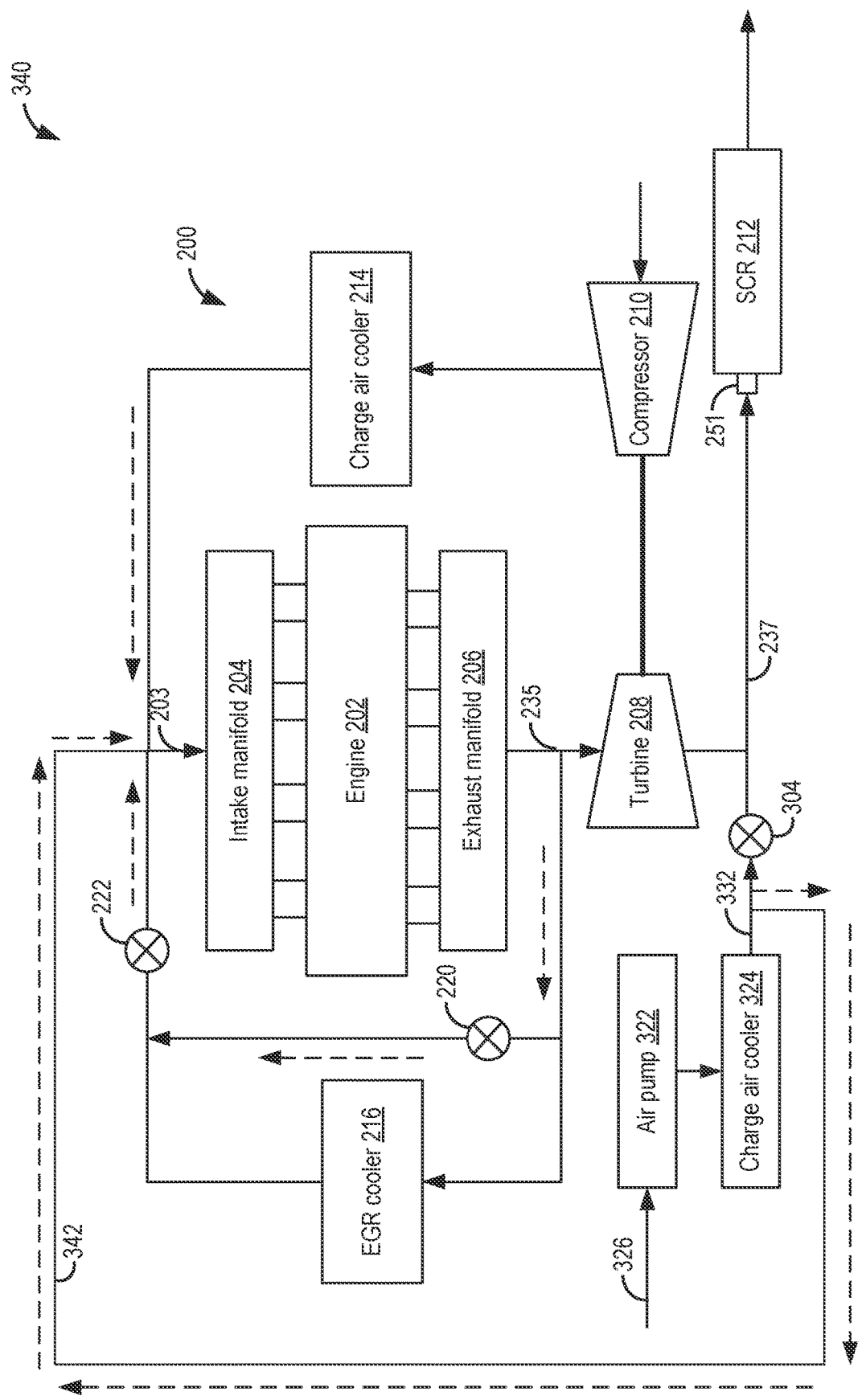
FIG. 3C shows the vehicle engine system of FIG. 3, where the pressurized air of the air pump is routed to an intake of an engine of the engine system.
Figure 3D:
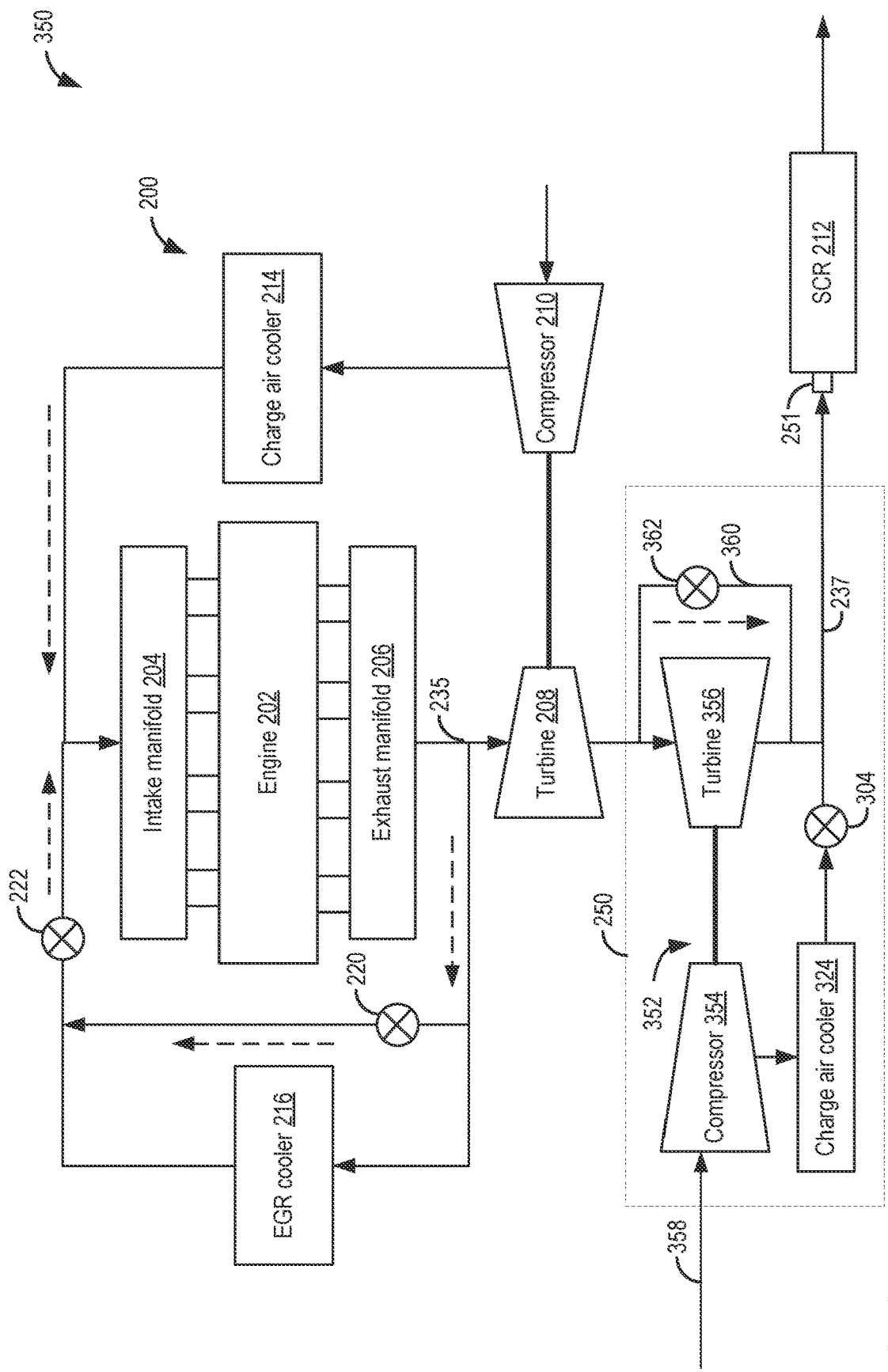
FIG. 3D shows the vehicle engine system of FIG. 2, where the exhaust gas cooling system includes a secondary dilution turbocharger that flows pressurized air into the exhaust gases.
Figure 4:
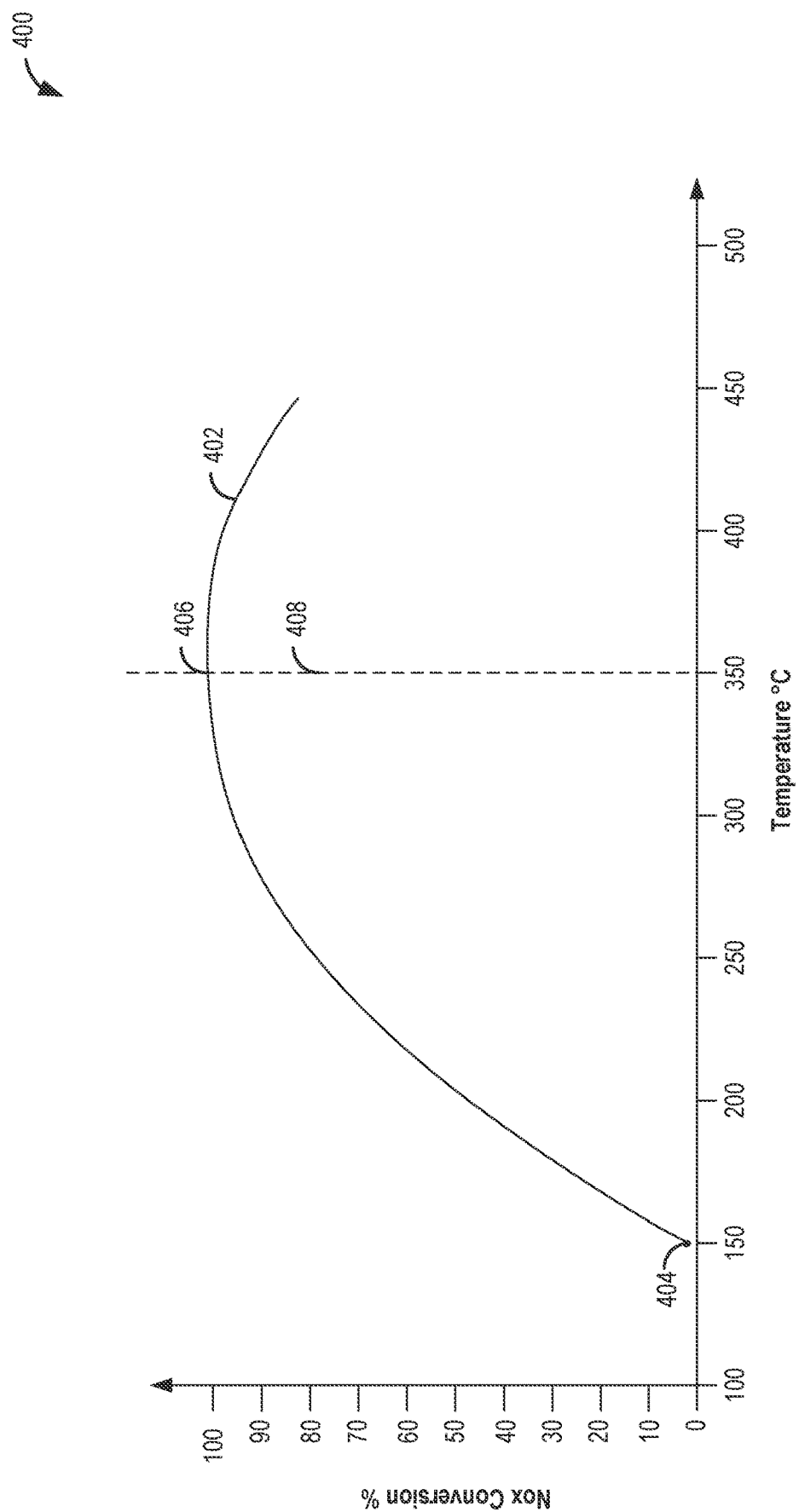
FIG. 4 shows a graph indicating an NOx conversion rate at different exhaust temperatures.

The following description relates to systems and methods for controlling a temperature of exhaust gases of an engine of a vehicle to increase an efficiency of a Selective Catalytic Reduction (SCR) system of the vehicle. A hybrid vehicle propulsion system configured to operate with one or both of motor torque from an electric motor and engine torque from an internal combustion engine is shown in FIG. 1. FIG. 2 shows an engine system of the vehicle, which may include a cooling system to cool the exhaust gases prior to the exhaust gases entering the SCR system. The cooling system may control the temperature of the exhaust gases by injecting cooled air into the exhaust gases. In a first embodiment, the cooled air is pressurized by a compressor of a primary turbocharger of the engine system and cooled by a primary charge air cooler, as shown in FIG. 3A. For the purposes of this disclosure, the primary turbocharger refers to a turbocharger operated to route compressed air to an air intake manifold of the engine to increase a performance of the engine. In a second embodiment, the cooled air is pressurized by an air pump and cooled by a secondary charge air cooler, as shown in FIG. 3B, where the temperature of the exhaust gases may be controlled by following one or more steps of the method described in FIG. 5. In a third embodiment, the cooled air pressurized by the air pump is additionally routed to an intake of the engine to supercharge the engine. In a fourth embodiment, the cooled air is pressurized by a dilution compressor of a secondary dilution turbocharger, and cooled by the secondary charge air cooler, as shown in FIG. 3D, where the temperature of the exhaust gases may be controlled by following one or more steps of the method described in FIG. 6. An efficiency of the SCR system may depend on a temperature of the exhaust gases, as shown in FIG. 4.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV) or simply a hybrid vehicle. Alternatively, the propulsion system 100 depicted herein may be termed a plug-in hybrid electric vehicle (PHEV).

Vehicle propulsion system 100 may be operated in a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated (herein also referred to as an electric mode). Herein, the engine may be shut down to rest while the motor propels vehicle motion.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator operation in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated (herein also referred to as an engine mode). During other operating conditions, both engine 110 and motor 120 may each be operated to propel the vehicle via drive wheel 130 as indicated by arrows 112 and 122, respectively (herein also referred to as an assist mode). A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator operation to convert the engine output to electrical energy, where the electrical energy may be stored at energy storage device 150 for later use by the motor.

Engine 110 may further include an exhaust system, which may include an exhaust gas aftertreatment system. The aftertreatment system may capture and/or convert certain exhaust gas constituents (e.g., NOx, CO, hydrocarbons, particulate matter, and the like) to inert or benign gases. Some examples of such aftertreatment systems include diesel particulate filters (DPF), diesel oxidation catalyst (DOC), lean NOx traps (LNT), ammonia slip, and SCR devices. For example, an SCR system of a diesel engine may convert NOx to nitrogen and water. When exhaust gases flow through the aftertreatment system, a conversion efficiency may depend on a temperature of the exhaust gas. If the temperature of the exhaust gas is above a threshold temperature, conversion efficiency may be lower than desired. In some embodiments, the exhaust system may include an exhaust gas cooling system arranged upstream of the aftertreatment system, to maintain the temperature of the exhaust gas within a desired range of temperatures. An exemplary exhaust gas cooling system for an SCR system is described in greater detail below in reference to FIGS. 2-6.

Fuel system 140 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Thus, liquid fuel may be supplied from fuel tank 144 to engine 110 of the motor vehicle shown in FIG. 1. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

The vehicle propulsion system 100 may also include an ambient temperature/humidity sensor 198 and a roll stability control sensor, such as a lateral and/or longitudinal and/or yaw rate sensor(s) 199. Control system 190 may communicate with one or more of engine 110, motor 120, fuel system 140, energy storage device 150, and generator 160, as well as an exhaust system of engine 110 (not shown in FIG. 1). Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

Referring now to FIG. 2, a block diagram of an embodiment of an engine system 200 is shown. In the illustrated embodiment, engine system 200 may be disposed in a vehicle such as an automobile or a truck. In still other embodiments, engine system 200 may be included in a different type of vehicle, or any other equipment that relies on tractive effort generated by a one or more engines. Engine system 200 may include a diesel engine 202, which may be a non-limiting embodiment of engine 110 of FIG. 1.

Engine 202 includes an intake manifold 204 and an exhaust manifold 206. Fresh intake air enters intake manifold 204 via an air intake passage 203. During operation of engine 202, exhaust gases produced by engine 202 exit engine 202 through an exhaust manifold 206. Exhaust manifold 206 routes the exhaust gases to the atmosphere (e.g., via a tailpipe of a vehicle) via an exhaust passage 235.

Engine 202 includes a plurality of cylinders (not shown in FIG. 2) that may each include at least one intake valve, at least one exhaust valve, and at least one fuel injector. Each fuel injector may include an actuator that may be actuated via a signal from a controller 262 of engine 202. The cylinders of the engine may receive fuel from a fuel system (not shown in FIG. 2).

During operation, each cylinder within the engine may use a four stroke cycle: the cycle includes the intake stroke, compression stroke, expansion stroke, and exhaust stroke. During the intake stroke, generally, the exhaust valve closes and the intake valve opens. Air is introduced into the combustion chamber via the intake manifold, and the piston moves to the bottom of the cylinder so as to increase the volume within the combustion chamber. The position at which the piston is near the bottom of the cylinder and at the end of its stroke (e.g. when the combustion chamber is at its largest volume) is typically referred to by those of skill in the art as bottom dead center (BDC). During the compression stroke, the intake valve and the exhaust valve are closed. The piston moves toward the cylinder head so as to compress the air within the combustion chamber. The point at which piston is at the end of its stroke and closest to the cylinder head (e.g. when the combustion chamber is at its smallest volume) is typically referred to by those of skill in the art as top dead center (TDC). In a process hereinafter referred to as direct injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push the piston back to BDC. The crankshaft converts piston movement into a rotational torque of the rotary shaft. Finally, during the exhaust stroke, the exhaust valve opens to release the combusted air-fuel mixture to the exhaust manifold and the piston returns to TDC.

Engine system 200 may include a turbocharger 215 arranged on exhaust passage 235. Turbocharger 215 increases an air charge of ambient air drawn into the air intake passage 203 in order to provide greater charge density during combustion to increase power output and/or engine-operating efficiency. The turbocharger may include an engine air intake compressor 210 disposed in an air intake line 217, which may be at least partially driven by a turbine 208 disposed in exhaust passage 235. Turbine 208 may be a fixed geometry turbine, or a variable geometry turbine, where a variable vane control adjusts a position of variable geometry turbine vanes. Exhaust gases may pass through turbine 208 supplying little energy to rotate turbine 208 when vanes are in an open position, while exhaust gases may pass through turbine 208 and impart increased force on turbine 208 when vanes are in a closed position. As turbine 208 rotates, heat and kinetic energy in the exhaust gases may be converted into mechanical energy, which may be used to drive engine air intake compressor 210 to draw in fresh air through an air intake passage 224, and deliver pressurized air to intake manifold 204 (e.g., to provide a pressure boost to cylinders of the engine based on engine operating conditions).

By compressing fresh air entering intake manifold 204 of engine 202 via air intake passage 203, a performance of engine 202 may be increased. Compressing the fresh air may also increase a temperature of the pressurized air. The temperature of the pressurized air may be reduced by a charge air cooler 214 arranged upstream of air intake passage 203, which may cool the pressurized air prior to delivery to engine 202 via intake manifold 204.

Engine system 200 may include a control system 260. Control system 260 is shown receiving information from a plurality of sensors 264 (examples of which are described herein) and sending control signals to a plurality of actuators 266 (examples of which are described herein). For example, sensors 264 may include an engine speed sensor, an engine load sensor, a manifold absolute pressure (MAP) sensor, a barometric pressure (BP) sensor, an exhaust gas sensor located in exhaust manifold 206, and/or other sensors such as pressure, temperature, air/fuel ratio (AFR), and composition sensors coupled to various locations in engine system 200. As another example, the actuators may include one or more throttles and/or valves that may control a flow of exhaust gases through engine system 200, as described below. It should be appreciated that the examples provided herein are for illustrative purposes and other types of sensors and/or actuators may be included without departing from the scope of this disclosure.

The control system 260 may include a controller 262. The controller may receive input data from the various sensors, process the input data, and trigger the actuators in response to the processed input data based on instruction or code programmed therein corresponding to one or more routines. The controller 262 may include a processor. The processor may generally include any number of microprocessors, ASICs, ICs, etc. The controller 262 may include a memory (e.g., FLASH, ROM, RAM, EPROM and/or EEPROM) that stores instructions that may be executed to carry out one more control routines. As discussed herein, memory includes any non-transient computer readable medium in which programming instructions are stored. For the purposes of this disclosure, the term tangible computer readable medium is expressly defined to include any type of computer readable storage. The example methods and systems may be implemented using coded instruction (e.g., computer readable instructions) stored on a non-transient computer readable medium such as a flash memory, a read-only memory (ROM), a random-access memory (RAM), a cache, or any other storage media in which information is stored for any duration (e.g. for extended period time periods, permanently, brief instances, for temporarily buffering, and/or for caching of the information). Computer memory of computer readable storage mediums as referenced herein may include volatile and non-volatile or removable and non-removable media for a storage of electronic-formatted information such as computer readable program instructions or modules of computer readable program instructions, data, etc. that may be stand-alone or as part of a computing device. Examples of computer memory may include any other medium which can be used to store the desired electronic format of information and which can be accessed by the processor or processors or at least a portion of a computing device.

Engine system 200 may include an exhaust gas recirculation (EGR) system 213. EGR system 213 may reduce an amount of emissions released into the atmosphere, by routing a portion of the exhaust gases exiting exhaust manifold 206 back into intake manifold 204 via air intake passage 203. A flow of the portion of the exhaust gases redirected back into intake manifold 204 may be controlled by an EGR valve 222. For example, when EGR valve 222 is adjusted to an open position, the exhaust gases exiting exhaust manifold 206 may flow through EGR valve 222 into intake manifold 204, and when EGR valve 222 is adjusted to a closed position, the exhaust gases exiting exhaust manifold 206 may not flow through EGR valve 222 into intake manifold 204.

EGR system 213 may include an EGR cooler 216, which may reduce a temperature of the exhaust gases exiting exhaust manifold 206 prior to the exhaust gases entering intake manifold 204 via air intake passage 203. Additionally, EGR system 213 may include an EGR cooler bypass valve 220 arranged on an EGR cooler bypass line 221. EGR cooler bypass valve 220 may control a flow of the portion of exhaust gases redirected through EGR system 213 through EGR cooler 216. For example, EGR cooler bypass valve 220 may be adjusted to a closed position, whereby the portion of exhaust gases may flow through EGR cooler 216, or EGR cooler bypass valve 220 may be adjusted to an open position, whereby most or all of the portion of exhaust gases may flow into intake manifold 204 via EGR cooler bypass line 221 and not through EGR cooler 216. In another example, EGR cooler bypass valve 220 may be adjusted to a different position (e.g., between open and closed) to control an amount of the portion of exhaust gases flowing through EGR cooler 216. In this way, the temperature of the exhaust gases entering intake manifold 204 may be controlled and maintained within a desired temperature range (e.g., where the desired temperature range is a range of temperatures at which a performance of engine 202 is maximized).

Engine system 200 may include an SCR system 212 coupled to an exhaust passage 237, downstream of turbine 208. In various embodiments, SCR system 212 may be disposed at an outlet of exhaust passage 237. SCR system 212 may convert NOx to nitrogen and water, thereby reducing an amount of emissions released into the atmosphere via the exhaust gases. An exhaust gas temperature sensor 251 may be arranged at or upstream of an inlet of SCR system 212, which may measure a temperature of the exhaust gases prior to entering SCR system 212. Additionally, one or more AFR sensors or oxygen ($O_2$) sensors may be arranged on an exhaust conduit upstream and/or downstream of the SCR system (not shown in FIG. 2).

Catalysts are shown to exhibit a maximum (e.g., peak) conversion at a particular exhaust gas temperature. As such, for minimizing vehicle emissions, it may be desirable to maintain exhaust gases entering the SCR system within a range of temperatures near a peak conversion temperature for NOx conversion. For example, no conversion may occur at low exhaust gas temperatures (e.g., below approximately 120° C.). As a temperature of the exhaust gases in the SCR system increases, the conversion rates of a catalyst used to treat the exhaust gases may increase. As the temperature of the exhaust gases increases above a first threshold temperature (e.g., 150° C.), the conversion rates may increase steeply with increasing temperature to maximum conversions rates. At high exhaust gas temperatures (e.g., 350° C.), the catalyst performance stabilizes to form a characteristic plateau on a conversion curve. As such, for minimizing vehicle emissions, it may be desirable to maintain exhaust gas temperatures at or near the peak conversion temperature for NOx conversion, and within a range in which typical SCR systems exhibit near maximum conversion efficiency.

In particular, FIG. 4 shows a NOx conversion graph 400, with a NOx conversion line 402 that plots a rate of conversion of NOx as a function of temperature of a catalyst used for the conversion. For the purposes of this disclosure, the temperature of the catalyst may be the same as the temperature of the exhaust gases. As indicated by a point 404 on NOx conversion line 402, below a temperature of 150° C., little or no NOx conversion occurs. Between 150° C. and 300° C., the rate of NOx conversion increases rapidly, until reaching a maximum NOx conversion rate at the peak conversion temperature at point 406 (e.g., close to 100% NOx conversion), at around 350° C., as indicated by dashed line 408. However, after reaching the maximum NOx conversion rate at a point 406, NOx conversion line 402 shows that an efficiency of the NOx conversion decreases as the temperature of the catalyst increases beyond 350° C. Thus, vehicle emissions may be minimized by controlling the temperature of the exhaust gases to maintain the temperature at or near the peak conversion temperature at point 406. As described in greater detail below, controlling the temperature of the exhaust gases may include injecting cooled, pressurized air into the exhaust gases responsive to the temperature of the exhaust gases increasing above the peak conversion temperature, and decreasing or stopping the injection of the cooled, pressurized air responsive to the temperature of the exhaust gases decreasing below the peak conversion temperature, to maintain the temperature of the exhaust gases at or near the peak conversion temperature.

Returning to FIG. 2, to control the temperature of the exhaust gases entering the SCR system, engine system 200 includes an exhaust gas cooling system 250 disposed on an exhaust passage 237 upstream of SCR system 212. Exhaust gas cooling system 250 may be controlled by controller 262 to ensure that an efficiency of SCR system 212 is maximized. For example, if exhaust gas temperature sensor 251 indicates that the temperature of the exhaust gases exceeds a peak efficiency threshold temperature, controller 262 may adjust one or more parameters of exhaust gas cooling system 250 to reduce the temperature of the exhaust gases. In various embodiments, the peak efficiency threshold temperature is an upper bound of a temperature range at which a level of emissions of the vehicle may be minimized. Exhaust gas cooling system 250 is described in greater detail below in reference to FIG. 3A-3D.

It will be appreciated that other components may be included in engine 202 such as a variety of valves and sensors.

Referring now to FIG. 3A, a first embodiment 300 of exhaust gas cooling system 250 of engine system 200 is shown, where cooled, pressurized air may be injected into exhaust gases to reduce a temperature of the exhaust gases in exhaust passage 237 prior to entering SCR system 212 of engine system 200. In first embodiment 300, the pressurized air is pressurized by engine air intake compressor 210 as a result of the exhaust gases being routed through turbine 208 of turbocharger 215. The pressurized air exiting engine air intake compressor 210 is routed through charge air cooler 214, which may cool the pressurized air prior to delivering the pressurized air to intake manifold 204 via air intake passage 203. As indicated in FIG. 3A, a portion of the cooled, pressurized air may be routed to exhaust passage 237 leading to SCR system 212 via an air passage 302. An exhaust gas dilution valve 304 may be positioned on exhaust passage 237, such that exhaust gas dilution valve 304 may be controlled to adjust an amount of the cooled, pressurized air injected into the exhaust gases in exhaust passage 237.

A composition of a mixture of exhaust gases and cooled, pressurized air in exhaust passage 237 may be controlled by exhaust gas dilution valve 304. In some embodiments, exhaust gas dilution valve 304 may be a pressure valve that allows the cooled, pressurized air to pass through exhaust gas dilution valve 304 if a pressure of the cooled, pressurized air exceeds a threshold pressure. For example, in one embodiment, the threshold pressure may be 1.7-2.0 bar absolute. In another embodiment, the threshold pressure may be 2-3 kPa. In various embodiments, exhaust gas dilution valve 304 may be an adjustable valve that may be controlled by a controller (e.g., controller 262). For example, if exhaust gas dilution valve 304 is adjusted to a closed position, no cooled, pressurized air may mix with the exhaust gases in exhaust passage 237. As exhaust gas dilution valve 304 is opened, an amount of cooled, pressurized air mixing with the exhaust gases at exhaust passage 237 may increase, to a maximum dilution of the exhaust gases when exhaust gas dilution valve 304 is fully open. A degree to which the temperature of the exhaust gases is reduced may depend on an amount (e.g., a percentage) of cooled, pressurized air in the exhaust gases.

For example, upon initiation of engine operation, a temperature of the exhaust gases may be below the peak efficiency threshold temperature, whereby an efficiency of NOx conversion may be below a desired efficiency. To increase the temperature of the exhaust gases, thereby increasing the efficiency of the NOx conversion, exhaust gas dilution valve 304 may be actuated to a closed position, such that no cooled, pressurized air is injected into the exhaust gases in the exhaust passage 237. During operation of engine 202, the temperature of the exhaust gases may increase to the peak efficiency threshold temperature. Upon achieving the peak efficiency threshold temperature, further increases in the temperature of the exhaust gases may reduce the efficiency of the NOx conversion at SCR system 212. Therefore, to maintain the temperature of the exhaust gases at or near the peak efficiency threshold temperature, exhaust gas dilution valve 304 may be actuated to an open position, to inject the cooled, pressurized air from air passage 302 into the exhaust gases, thereby reducing the temperature of the exhaust gases prior to entering SCR system 212.

The open position of exhaust gas dilution valve 304 may be a partially open position. For example, as the temperature of the exhaust gases increases above the peak efficiency threshold temperature, exhaust gas dilution valve 304 may be adjusted to a fully open position. As a result of adjusting exhaust gas dilution valve 304 to the fully open position, the temperature of the exhaust gases may decrease below the peak efficiency threshold temperature by a threshold temperature difference, due to an amount of cooled, pressurized air injected into the exhaust gases. In response to the temperature of the exhaust gases decreasing below the peak efficiency threshold temperature, exhaust gas dilution valve 304 may be adjusted from the fully open position to a partially open position (e.g., partially closed), to reduce the amount of cooled, pressurized air injected into the exhaust gases. As a result of reducing the amount of cooled, pressurized air injected into the exhaust gases, the temperature of the exhaust gases may increase towards the peak efficiency threshold temperature. In this way, the temperature of the exhaust gases may be maintained at a desired temperature range around the peak efficiency threshold temperature by controlling (e.g., via controller 262 of FIG. 2) the amount of cooled, pressurized air injected into the exhaust gases via exhaust gas dilution valve 304.

FIG. 3B shows a second embodiment 320 of exhaust gas cooling system 250 of engine system 200 where cooled, pressurized air may be injected into the exhaust gases to reduce the temperature of the exhaust gases prior to entering SCR system 212. In second embodiment 320, fresh air received via an air intake passage 326 is pressurized by an air pump 322. The pressurized air exiting air pump 322 may then be routed through a secondary charge air cooler 324, which may cool the pressurized air prior to injecting the cooled, pressurized air into the exhaust gases in exhaust passage 237 leading to SCR system 212. As described above in reference to first embodiment 300 of FIG. 3A, the cooled, pressurized air injected into the exhaust gases in exhaust passage 237 may be controlled by exhaust gas dilution valve 304.

In various embodiments, air pump 322 may be mechanically coupled to engine 202, as indicated by a dotted line 330, such that air pump 322 is powered by engine 202. An advantage of using engine 202 to power air pump 322 is that an additional power source may not be relied on for pressurizing the fresh air entering air pump 322 via air intake passage 326. Alternatively, in other embodiments, air pump 322 may be powered by a battery 328 of the vehicle, or by a different power source.

Controlling the cooled, pressurized air injected into the exhaust gases via exhaust gas dilution valve 304 may include operating air pump 322 in conjunction with exhaust gas dilution valve 304. For example, air pump 322 may not be continuously operated during operation of engine 202. In some embodiments, air pump 322 may be switched on when exhaust gas dilution valve 304 is actuated to an open or partially open position to inject the cooled, pressurized air into the exhaust gases, and air pump 322 may be switched off when exhaust gas dilution valve 304 is actuated to a closed position, and no cooled, pressurized air is being injected into the exhaust gases. Alternatively, air pump 322 may be initially switched on (e.g., at engine startup) to generate a threshold pressure in an air delivery passage 332, and air pump 322 may be switched off when the threshold pressure has been achieved. Accordingly, when exhaust gas dilution valve 304 is actuated to an open or partially open position, air pump 322 may be switched on to maintain the threshold pressure in air delivery passage 332, and when exhaust gas dilution valve 304 is actuated to a closed position, air pump 322 may be switched off once the threshold pressure is achieved. An exemplary method for controlling exhaust gas dilution valve 304 and air pump 322 to maintain the temperature of the exhaust gases within a desired temperature range is described in greater detail below in reference to FIG. 5.

In other embodiments, air pump 322 may be continuously operated during operation of engine 202. For example, FIG. 3C shows a third embodiment 340 of exhaust gas cooling system 250 of engine system 200, where fresh air received via air intake passage 326 is pressurized by air pump 322 and injected into the exhaust gases prior to entering SCR system 212, as described above. However, in third embodiment 340, some or all of the cooled, pressurized air exiting secondary charge air cooler 324 may be routed to air intake passage 203 of intake manifold 204 via an air passage 342, supercharging engine 202.

For example, during operation of engine 202, air pump 322 may operate continuously. For a first duration during which the temperature of the exhaust gases is below the peak efficiency threshold temperature, exhaust gas dilution valve 304 may be actuated to a closed position, whereby no cooled, pressurized air may be injected into the exhaust gases in exhaust passage 237. During the first duration when exhaust gas dilution valve 304 is closed, the cooled, pressurized air generated by air pump 322 and cooled by secondary charge air cooler 324 may be routed to intake manifold 204 via air passage 342, supercharging engine 202. For a second duration during which the temperature of the exhaust gases is above the peak efficiency threshold temperature, exhaust gas dilution valve 304 may be actuated to an open position, whereby the cooled, pressurized air generated by air pump 322 and cooled by secondary charge air cooler 324 may be injected into the exhaust gases to reduce the temperature of the exhaust gases. During the second duration, a first portion of the cooled, pressurized air may be injected into the exhaust gases, and a second portion of the cooled, pressurized air may be routed to intake manifold 204 via air passage 342. During the second duration, a ratio of the first portion to the second portion may depend on a position of exhaust gas dilution valve 304. For example, if exhaust gas dilution valve 304 is actuated to a 50% open position, 50% of the cooled, pressurized air may be injected into the exhaust gases, and 50% of the cooled, pressurized air may be routed to intake manifold 204. For a third duration, the temperature of the exhaust gases may decrease below the peak efficiency threshold temperature as a result of the cooled, pressurized air being injected into the exhaust gases, whereby exhaust gas dilution valve 304 may be actuated to a closed position. When exhaust gas dilution valve 304 is actuated to the closed position during the third duration, all of the cooled, pressurized air may be routed to intake manifold 204. In this way, pressurized air generated by the continuous operation of air pump 322 may be used to supercharge engine 202 when the exhaust gases are within a desired temperature range, and a portion of the pressurized air may be used to reduce the temperature of the exhaust gases when the exhaust gases exceed the desired temperature range.

Referring now to FIG. 3D, a fourth embodiment 350 of exhaust gas cooling system 250 of engine system 200 is shown, where cooled, pressurized air may be injected into the exhaust gases to reduce the temperature of the exhaust gases prior to entering SCR system 212. In fourth embodiment 350, exhaust gas cooling system 250 includes a second, exhaust gas dilution turbocharger 352 arranged on exhaust passage 237, downstream of turbine 208 of turbocharger 215 (e.g., between turbocharger 215 and SCR system 212). Exhaust gas dilution turbocharger 352 may include a dilution turbine 356 and a dilution compressor 354. Dilution turbine 356 may be mechanically coupled to dilution compressor 354, such that dilution compressor 354 is powered by exhaust gases flowing through dilution turbine 356, after exiting exhaust manifold 206 via exhaust passage 235 and passing through turbine 208.

A rotation of dilution turbine 356 caused by the exhaust gases passing through dilution turbine 356 may draw fresh air into dilution compressor 354, via an air intake passage 358. The fresh air may be pressurized by dilution compressor 354, and may exit dilution compressor 354 and enter exhaust passage 237 leading to SCR system 212. The pressurized fresh air may mix with the exhaust gases exiting dilution turbine 356 at exhaust passage 237, prior to entering SCR system 212, thereby diluting the exhaust gases with the fresh air. By diluting the exhaust gases with the fresh air, the temperature of the exhaust gases entering SCR system 212 may be reduced, as described above.

As the exhaust gases flow through dilution turbine 356, enthalpy (e.g., energy in the form of heat) in the exhaust gases may be extracted from the exhaust gases, reducing a temperature of the exhaust gases. The enthalpy may be transferred to a rotational energy of dilution turbine 356, which in turn may power dilution compressor 354. Thus, excess energy in the exhaust gases may be removed by dilution turbine 356 due to extraction of enthalpy, causing a first reduction in the temperature of the exhaust gases. Fresh air pressurized by dilution compressor 354 may then be cooled by secondary charge air cooler 324 and injected into the exhaust gases, causing a second reduction of the temperature of exhaust gases.

Further, by routing the exhaust gases produced by engine 202 through dilution turbine 356, a speed of a flow of air through dilution compressor 354 and through SCR system 212 may be controlled (e.g., by controller 262 of control system 260). By controlling the speed of the airflow through SCR system 212, the temperature of the exhaust gases may be increased or reduced to maintain the temperature at or near a temperature associated with a maximum efficiency of NOx conversion (e.g., 350° C., as shown in FIG. 4). For example, controller 262 may increase a speed of dilution turbine 356 (for example, by adjusting a position of vanes of dilution turbine 356), thereby increasing a pressure of the fresh air entering exhaust passage 237. As a result of the increased pressure, a mass flow of cooled, pressurized air through SCR system 212 may increase, reducing the temperature of the exhaust gases through SCR system 212. Alternatively, controller 262 may decrease the speed of dilution turbine 356, thereby decreasing the pressure of the fresh air entering exhaust passage 237. As a result of the decreased pressure, the mass flow of cooled, pressurized air through SCR system 212 may decrease, increasing the temperature of the exhaust gases through SCR system 212.

Under some circumstances, exhaust gases exiting exhaust manifold 206 and passing through turbine 208 may not be routed through exhaust gas dilution turbocharger 352. For example, when engine 202 starts, the temperature of engine 202 and other components of engine system 200 may be low. As a result of the low engine temperature, the temperature of the exhaust gases passing through SCR system 212 may be below or within a desirable temperature range for NOx conversion. When the temperature of the exhaust gases passing through SCR system 212 is below or within the desirable temperature range for NOx conversion, the exhaust gases exiting turbine 208 may not be routed through exhaust gas dilution turbocharger 352, and may be routed to SCR system 212 via a dilution turbine bypass line 360. A dilution bypass valve 362 may be disposed on dilution turbine bypass line 360, which may be actuated (e.g., by controller 262) to control a flow of the exhaust gases through dilution turbine bypass line 360. For example, if the dilution bypass valve 362 is adjusted to an open position, at least some of the exhaust gases may flow through dilution turbine bypass line 360 to the exhaust passage 237 and on to SCR system 212.

Exhaust gas dilution valve 304 may be actuated in conjunction with dilution bypass valve 362 to achieve a desired mixture and flow of air and exhaust gases through SCR system 212. For example, prior to the exhaust gases reaching a peak efficiency threshold temperature (e.g., a temperature at which an efficiency of NOx conversion begins to decrease), dilution bypass valve 362 may be actuated to an open position and exhaust gas dilution valve 304 may be actuated to a closed position, to allow the exhaust gases to bypass dilution turbine 356 and be routed to SCR system 212 without passing through exhaust gas dilution turbocharger 352. Alternatively, when the exhaust gases reach the peak efficiency threshold temperature, dilution bypass valve 362 may be actuated to a more closed position and exhaust gas dilution valve 304 may be actuated to a more open position, to route at least a portion of the exhaust gases into dilution turbine 356 of exhaust gas dilution turbocharger 352, where the exhaust gases may be cooled as described above. Exhaust gas dilution valve 304 may also be actuated to a first partially open position, and dilution bypass valve 362 may be actuated to a second partially open position, to facilitate the desired mixture of air and exhaust gases into SCR system 212. For example, the second partially open position of dilution bypass valve 362 may route a first portion of the exhaust gases exiting turbine 208 to exhaust passage 237, and may route a second portion of the exhaust gases exiting turbine 208 to exhaust passage 237 through exhaust gas dilution turbocharger 352. The first partially open position of exhaust gas dilution valve 304 may be a position that allows the fresh air to enter exhaust passage 237 at a desired airflow (e.g., based on a ratio of the second portion to the first portion), where the desired airflow achieves an optimal mixture of air and exhaust gases and an optimal airflow speed through SCR system 212.

In this way, the temperature of the exhaust gases at SCR system 212 may be maintained within the desired range by a selective use of exhaust gas dilution turbocharger 352. The selective use of exhaust gas dilution turbocharger 352 is described in greater detail below in reference to FIG. 6.

Figure 5:
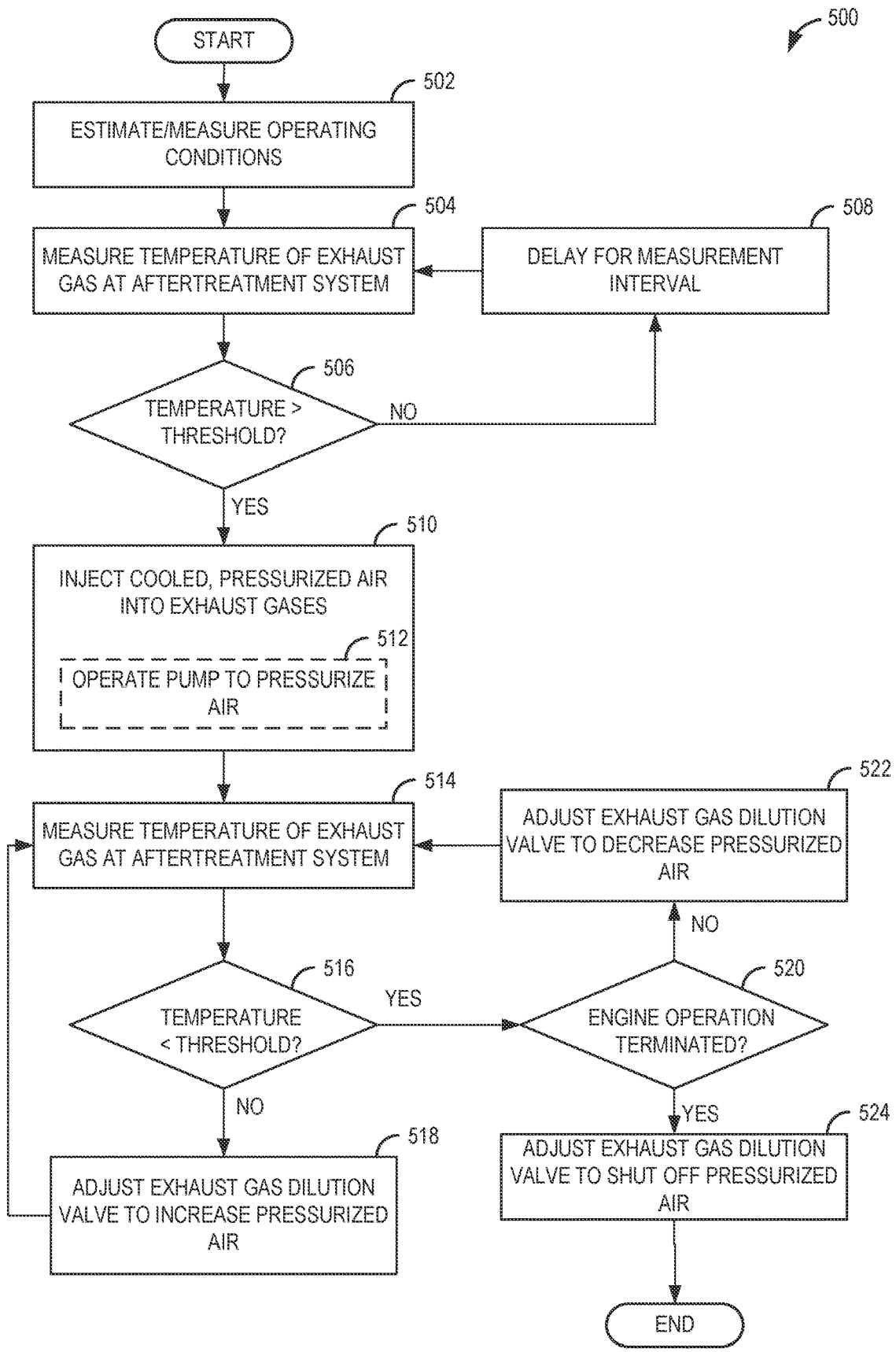
FIG. 5 shows a flowchart illustrating an first exemplary procedure for controlling a temperature of exhaust gases routed into an SCR system.

Referring now to FIG. 5, a first exemplary method 500 is shown for controlling a temperature of exhaust gases entering an SCR system disposed on an exhaust passage of an engine by injecting cooled, pressurized air into the exhaust gases responsive to the temperature exceeding a peak efficiency threshold temperature at which an efficiency of the SCR system (e.g., SCR system 212 of engine system 200) is maximized. When the efficiency of the SCR system is maximized, a level of emissions of the vehicle may be minimized. Method 500 is described in relation to an engine system of a vehicle, such as engine system 200 of vehicle propulsion system 100. Method 500 may be executed by a processor of a controller of the engine system, such as controller 262 of FIG. 2, based on instructions stored in a memory of the controller.

Method 500 begins at 502, where method 500 includes estimating and/or measuring engine operating conditions. Estimating and/or measuring engine operating conditions may include, but are not limited to, determining whether the vehicle is being powered by an engine or an electric motor, a status of the engine, an AFR of fuel delivered at the cylinders of the engine, and/or a status of one or more diagnostic routines operating in the engine system or exhaust system. Engine operating conditions may be estimated based on one or more outputs of various sensors of the engine or corresponding vehicle, such as oil temperature sensors, engine velocity or wheel velocity sensors, torque sensors, etc., as described above in reference to vehicle propulsion system 100 of FIG. 1. Engine operating conditions may include engine velocity and load, vehicle velocity, transmission oil temperature, exhaust gas flow rate, mass air flow rate, coolant temperature, coolant flow rate, engine oil pressures (e.g., oil gallery pressures), operating modes of one or more intake valves and/or exhaust valves, electric motor velocity, battery charge, engine torque output, vehicle wheel torque, etc. Estimating and/or measuring operating conditions may also include determining a state of one or more valves of the engine system, such as an exhaust gas dilution valve, as described below.

At 504, method 500 includes measuring a temperature of exhaust gases at an SCR system (e.g., SCR system 212 of FIGS. 2-3). In various embodiments, the temperature of the exhaust gases may be measured at an exhaust gas temperature sensor (e.g., exhaust gas temperature sensor 251 of FIGS. 2-3) disposed on an exhaust line (e.g., exhaust passage 237 of FIG. 3) of the engine system upstream of the SCR system.

At 506, method 500 includes determining whether the temperature of the exhaust gases is greater than a peak efficiency threshold temperature. The peak efficiency threshold temperature may be a temperature at which an efficiency of catalytic conversion (such as NOx conversion) of the exhaust gases is maximized, where if the temperature exceeds the peak efficiency threshold temperature, the efficiency begins to decrease. For example, if an efficiency of NOx conversion is targeted, the peak efficiency threshold temperature may be 350° C. In other words, prior to achieving the peak efficiency threshold temperature of 350° C., the efficiency of NOx conversion may be high and/or increasing, and when the peak efficiency threshold temperature of 350° C. is achieved, the efficiency of NOx conversion may begin to decrease, as described above in reference to FIG. 4.

If at 506 it is determined that the temperature of the exhaust gases is not greater than the peak efficiency threshold temperature, method 500 proceeds to 508. At 508, method 500 includes delaying for a measurement interval prior to taking a subsequent measurement of the temperature of the exhaust gases at the SCR system. In one embodiment, the measurement interval may be one second.

If at 506 it is determined that the temperature of the exhaust gases is greater than the peak efficiency threshold temperature, method 500 proceeds to 510. At 510, method 500 includes injecting cooled, pressurized air into the exhaust gases, to reduce the temperature. In various different embodiments, the cooled, pressurized air may be generated in different ways. The cooled, pressurized air may comprise fresh air compressed by an engine air intake compressor of a primary turbocharger of the engine system (e.g., turbocharger 215) and cooled by a primary charge air cooler, as described above in reference to first embodiment 300 of FIG. 3A. The cooled, pressurized air may comprise fresh air pressurized by an air pump (e.g., air pump 322) and cooled by a secondary air cooler (e.g., secondary charge air cooler 324), as described above in reference to second embodiment 320 of FIG. 3B.

An amount of the cooled, pressurized air injected into the exhaust gases may be controlled by adjusting an exhaust gas dilution valve (e.g., exhaust gas dilution valve 304) to a more open or more closed position. A degree to which the exhaust gas dilution valve is actuated to the more open or more closed position may depend on the temperature of the exhaust gases. As the temperature increases, the exhaust gas dilution valve may be actuated to a more open position to inject more cooled, pressurized air into the exhaust gases. As the temperature decreases, the exhaust gas dilution valve may be actuated to a more closed position to inject less cooled, pressurized air into the exhaust gases.

A desired amount of cooled, pressurized air injected into the exhaust gases may produce a desired dilution of the exhaust gases, where the desired dilution generates a desired reduction in the temperature of the exhaust gases entering the SCR system. The desired amount of cooled, pressurized air injected into the exhaust gases may also produce a desired speed of air flow of the exhaust gases through the SCR system, where the desired speed may also control the temperature of the exhaust gases within the SCR system. For example, as the speed of the exhaust gases through the SCR system increases, the temperature of the exhaust gases may decrease as a result of a greater mass of dilution air entering the exhaust gases, and as the speed of the exhaust gases through the SCR system decreases, the temperature of the exhaust gases may increase, as a result of a lesser mass of dilution air entering the exhaust gases.

At 512, injecting the cooled, pressurized air into the exhaust gases may include operating a pump to pressurize the cooled, pressurized air (e.g., in embodiments including an air pump such as second embodiment 320 of FIG. 3B). As described above in reference to FIG. 3B, controlling an injection of the cooled, pressurized air into the exhaust gases may include controlling an operation of the air pump in conjunction with the exhaust gas dilution valve. In embodiments such as second embodiment 320 where the air pump is not continuously operated, the air pump may be switched on when the exhaust gas dilution valve is actuated to an open position, and switched off when the exhaust gas dilution valve is actuated to a closed position; or the air pump may be switched on to generate a threshold pressure of the cooled, pressurized air, and switched off when the threshold pressure is achieved. In embodiments such as third embodiment 340 of FIG. 3C where the air pump is continuously operated, the cooled, pressurized air may be routed to an engine intake to increase a performance of the engine, and a portion of the cooled, pressurized air may be diverted into the exhaust gases to cool the gases when the exhaust gas dilution valve is opened.

At 514, method 500 includes measuring the temperature of the exhaust gases at the SCR system, as described above in reference to step 504. At 516, method 500 includes determining whether the temperature of the exhaust gases is less than the peak efficiency threshold temperature. If at 516 it is determined that the temperature of the exhaust gases is not less than the peak efficiency threshold temperature (e.g., greater than the peak efficiency threshold temperature), method 500 proceeds to 518.

At 518, method 500 includes adjusting the exhaust gas dilution valve to increase the amount of cooled, pressurized air injected into the exhaust gases prior to the exhaust gases entering the SCR system. By increasing the amount of cooled, pressurized air injected into the exhaust gases prior to the exhaust gases entering the after treatment system, the temperature of the exhaust gases may be decreased. In other words, provided that the temperature of the exhaust gases has not decreased below the peak efficiency threshold temperature, the controller may continue to cool the exhaust gases with pressurized fresh air.

Alternatively, if at 516 it is determined that the temperature of the exhaust gases has decreased below the peak efficiency threshold temperature, method 500 proceeds to 520. At 520, method 500 includes determining whether engine operation has been terminated. For example, a cause of the temperature of the exhaust gases decreasing below the peak efficiency threshold temperature may be that the engine is no longer operating. If engine operation has not been terminated, method 500 proceeds to 522.

At 522, method 500 includes adjusting the exhaust gas dilution valve to decrease the amount of cooled, pressurized air injected into the exhaust gases prior to the exhaust gases entering the SCR system. By decreasing the amount of cooled, pressurized air injected into the exhaust gases prior to the exhaust gases entering the after treatment system, the temperature of the exhaust gases may be increased.

Thus, the exhaust gas dilution valve may be adjusted to control the temperature of the exhaust gases at an intake of the SCR system. If the temperature of the exhaust gases increases above the peak efficiency threshold temperature, a larger percentage of the cooled, pressurized air may be injected into the exhaust gases to reduce the temperature. Alternatively, if the temperature of the exhaust gases decreases below the peak efficiency threshold temperature, a smaller percentage of the cooled, pressurized air may be injected into the exhaust gases to increase the temperature. In some cases, for example, after initiating operation of the engine, the smaller percentage may be zero, where no cooled, pressurized air may be injected into the exhaust gases.

If at 520 it is determined that engine operation has been terminated, method 500 may proceed to 524. At 524, method 500 may include adjusting the exhaust gas dilution valve to a closed position to stop injecting the cooled, pressurized air into the exhaust gases. For example, adjusting the exhaust gas dilution valve to the closed position may be desirable, as when the engine initiates operation at a future time, an initial temperature of the exhaust gases may be low, whereby initial conditions for a subsequent engine startup may include closing the exhaust gas dilution valve. Method 500 ends.

Figure 6:
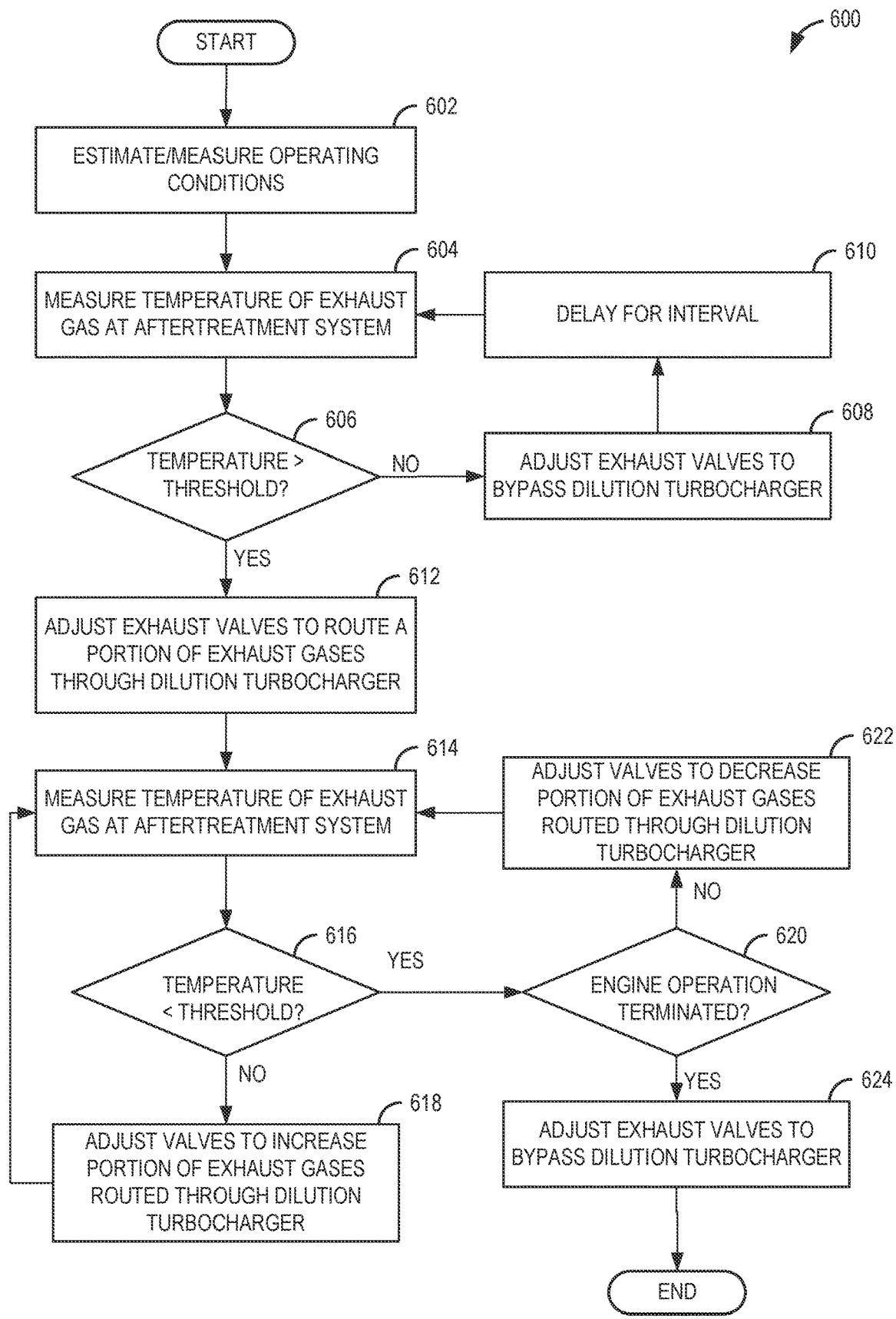
FIG. 6 shows a flowchart illustrating a second exemplary procedure for controlling a temperature of exhaust gases routed into an SCR system.

Referring now to FIG. 6, a second exemplary method 600 is shown for controlling the temperature of exhaust gases entering an SCR system by injecting cooled, pressurized air into the exhaust gases responsive to the temperature exceeding the peak efficiency threshold temperature, where the cooled, pressurized air is generated by an exhaust gas dilution turbocharger, as described above in reference to FIG. 3D. Method 600 is described in relation to an engine system of a vehicle, such as engine system 200 of vehicle propulsion system 100. The exhaust gas dilution turbocharger may include a dilution compressor (e.g., dilution compressor 354) coupled to a dilution turbine (e.g., dilution turbine 356), where exhaust gases routed through the dilution turbine drive the dilution compressor to pressurize fresh air received at the dilution compressor via an air intake passage. The pressurized fresh air may then be cooled by a secondary charge air cooler (e.g., secondary charge air cooler 324) prior to being injected into the exhaust gases. Method 600 may be executed by a processor of a controller of the engine system, such as controller 262 of FIG. 2, based on instructions stored in a memory of the controller.

Method 600 begins at 602, where method 600 includes estimating and/or measuring engine operating conditions. Estimating and/or measuring engine operating conditions may include, but are not limited to, determining whether the vehicle is being powered by an engine or an electric motor, a status of the engine, an AFR of fuel delivered at the cylinders of the engine, and/or a status of one or more diagnostic routines operating in the engine system or exhaust system. Engine operating conditions may be estimated based on one or more outputs of various sensors of the engine or corresponding vehicle, such as oil temperature sensors, engine velocity or wheel velocity sensors, torque sensors, etc., as described above in reference to vehicle propulsion system 100 of FIG. 1. Engine operating conditions may include engine velocity and load, vehicle velocity, transmission oil temperature, exhaust gas flow rate, mass air flow rate, coolant temperature, coolant flow rate, engine oil pressures (e.g., oil gallery pressures), operating modes of one or more intake valves and/or exhaust valves, electric motor velocity, battery charge, engine torque output, vehicle wheel torque, etc. Estimating and/or measuring operating conditions may also include determining a state of one or more valves of the engine system, such as an exhaust gas dilution valve and/or an exhaust gas dilution bypass valve, as described below.

At 604, method 600 includes measuring a temperature of exhaust gases at an SCR system (e.g., SCR system 212). In various embodiments, the temperature of the exhaust gases may be measured at an exhaust gas temperature sensor (e.g., exhaust gas temperature sensor 251) disposed on an exhaust line (e.g., exhaust passage 237) of the engine system upstream of the SCR system. At 606, method 600 includes determining whether the temperature of the exhaust gases is greater than a peak efficiency threshold temperature. The peak efficiency threshold temperature may be a temperature at which an efficiency of catalytic conversion (e.g., NOx conversion) of the exhaust gases is maximized, where if the temperature exceeds the peak efficiency threshold temperature, the efficiency begins to decrease. For example, the peak efficiency threshold temperature may be 350° C. In other words, prior to achieving the peak efficiency threshold temperature of 350° C., the efficiency of NOx conversion may be high and/or increasing, and when the peak efficiency threshold temperature of 350° C. is achieved, the efficiency of NOx conversion may begin to decrease, as described above in reference to FIG. 4.

If at 606 it is determined that the temperature of the exhaust gases is not greater than the peak efficiency threshold temperature, method 600 proceeds to 608. At 608, method 600 includes adjusting one or more exhaust valves to bypass the dilution turbine. For example, as described above in reference to FIG. 3D, a dilution bypass valve (e.g., dilution bypass valve 362) may be actuated to an open position, thereby routing the exhaust gases around the dilution turbine. Concurrently, an exhaust gas dilution valve (e.g., exhaust gas dilution valve 304) may be actuated to a closed position. As a result of the dilution bypass valve being actuated to the open position, and the exhaust gas dilution valve being actuated to the closed position, the exhaust gases may be routed to the SCR system, and no exhaust gases may be routed through the dilution turbine. As a result of no exhaust gases being routed through the dilution turbine, no pressurized air may be generated at the dilution compressor.

At 610, method 600 may delay for an interval (e.g., one second) prior to taking a subsequent measurement of the temperature of the exhaust gases at the SCR system.

If at 606 it is determined that the temperature of the exhaust gases is greater than the peak efficiency threshold temperature, method 600 proceeds to 612. At 612, method 600 includes adjusting the one or more exhaust valves to route a portion of the exhaust gases through the dilution turbine. For example, the dilution bypass valve may be actuated to a first partially open position, and the exhaust gas dilution valve may be actuated to a second partially open position, to allow the portion of the exhaust gases to be routed through the dilution turbine. For example, the first partially open position of the dilution bypass valve may be 50% open, thereby allowing a first half of the exhaust gases to be routed through the dilution turbine, and a second half of the exhaust gases to bypass the dilution turbine. The first half of the exhaust gases routed through the dilution turbine may combine with the second half of the exhaust gases that bypasses the turbine of the dilution turbocharger in an exhaust passage (e.g., exhaust passage 237) leading to the SCR system. A degree to which the dilution bypass valve and the exhaust gas dilution valve are actuated to an open or closed position may depend on the temperature of the exhaust gases.

When the exhaust gases pass through the dilution turbine, enthalpy may be extracted from the exhaust gases, thereby reducing the temperature of the exhaust gases. In other words, heat energy in the exhaust gases may be transferred to a rotational energy (e.g., work) of the turbine as the exhaust gases pass through vanes of the turbine, reducing the temperature of the exhaust gases. The energy extracted (e.g., transferred) from the exhaust gases may power the dilution compressor coupled to the turbine, which may generate a flow of pressurized air. The pressurized air may be routed into the secondary charge air cooler, which may cool the pressurized air. The cooled, pressurized air may then be injected into the exhaust gases in the exhaust passage upstream of the SCR system, further cooling the exhaust gases.

The second partially open position of the exhaust gas dilution valve may be a position at which a desired flow of cooled, pressurized air is injected into the exhaust gases downstream of the dilution turbine. The desired flow of cooled, pressurized air may produce a desired reduction in the temperature of the exhaust gases entering the SCR system. The desired flow of cooled, pressurized air may also propel the exhaust gases through the SCR system at a desired speed, where the desired speed may also control the temperature of the exhaust gases within the SCR system by increasing a mass flow of the cooled, pressurized air. For example, as the speed and mass flow of the exhaust gases through the SCR system increases, the temperature of the exhaust gases may decrease, and as the speed and mass flow of the exhaust gases through the SCR system decreases, the temperature of the exhaust gases may increase.

At 614, method 600 includes measuring the temperature of the exhaust gases at the SCR system, as described above in reference to step 604. At 616, method 600 includes determining whether the temperature of the exhaust gases is less than the peak efficiency threshold temperature. If at 616 it is determined that the temperature of the exhaust gases is not less than the peak efficiency threshold temperature (e.g., greater than the peak efficiency threshold temperature), method 600 proceeds to 618.

At 618, method 600 includes adjusting the one or more exhaust valves to increase the portion of exhaust gases routed through the dilution turbine. For example, the dilution bypass valve may be adjusted to a more closed position, and the exhaust gas dilution valve may be adjusted to a more open position. By increasing the portion of exhaust gases routed through the dilution turbine, an amount of cooled, pressurized air injected into the exhaust gases prior to the exhaust gases entering the SCR system may be increased. By increasing the amount of cooled, pressurized air injected into the exhaust gases, the temperature of the exhaust gases may be reduced. In other words, provided that the temperature of the exhaust gases has not decreased below the peak efficiency threshold temperature, the controller may continue to cool the exhaust gases with the cooled, pressurized air.

Alternatively, if at 616 it is determined that the temperature of the exhaust gases has decreased below the peak efficiency threshold temperature, method 600 proceeds to 620. At 620, method 600 includes determining whether engine operation has been terminated. For example, a cause of the temperature of the exhaust gases decreasing below the peak efficiency threshold temperature may be that the engine is no longer operating. If engine operation has not been terminated, method 600 proceeds to 622.

At 622, method 600 includes adjusting the one or more exhaust valves to decrease the portion of exhaust gases routed through the dilution turbine. For example, the dilution bypass valve may be adjusted to a more open position, and the exhaust gas dilution valve may be adjusted to a more closed position. By decreasing the portion of exhaust gases routed through the dilution turbine, an amount of cooled, pressurized air injected into the exhaust gases may be decreased. By decreasing the amount of cooled, pressurized air injected into the exhaust gases, the temperature of the exhaust gases may be increased.

Thus, the one or more exhaust valves (e.g., the dilution bypass valve and the exhaust gas dilution valve) may be adjusted, independently or in conjunction, to control the temperature of the exhaust gases at an intake of the SCR system. If the temperature of the exhaust gases increases above the peak efficiency threshold temperature, a larger percentage of the exhaust gases may be routed through the dilution turbine, where the exhaust gases may be diluted with the cooled, pressurized air to reduce the temperature. Alternatively, if the temperature of the exhaust gases decreases below the peak efficiency threshold temperature, a smaller percentage of the exhaust gases may be routed through the dilution turbine, reducing the dilution of the exhaust gases with the cooled, pressurized air and generating higher exhaust gas temperatures at the intake of the SCR system. In some cases, for example, after initiating operation of the engine, the smaller percentage may be zero, where all of the exhaust gases are routed to the SCR system without routing any of the exhaust gases through the dilution turbine. Alternatively, all of the exhaust gases may be routed through the dilution turbine, and none of the exhaust gases may be routed to the SCR system.

If at 620 it is determined that engine operation has been terminated, method 600 may proceed to 624. At 624, method 600 may include adjusting the one or more exhaust valves to bypass the dilution turbine. For example, the dilution bypass valve may be fully opened, and the exhaust gas dilution valve may be fully closed. Adjusting the one or more exhaust valves to bypass the dilution turbine may be desirable, as when the engine initiates operation at a future time, an initial temperature of the exhaust gases may be low, whereby an initial state of the engine system may include bypassing the dilution turbine. Method 600 ends.

Thus, a temperature of exhaust gases generated by an engine may be controlled and maintained at a desired temperature by including a dilution turbocharger in an engine system, where a portion of the exhaust gases may be routed through the dilution turbocharger to reduce the temperature of the exhaust gases, or the exhaust gases may be routed around the dilution turbocharger (e.g., bypassing the dilution turbocharger) to increase the temperature of the exhaust gases. The dilution turbocharger may be a secondary turbocharger arranged on an exhaust passage between an exhaust manifold of the engine and an SCR system, where a different, primary turbocharger may be used to flow pressurized air into an intake manifold of the engine. When the exhaust gases are routed through the dilution turbocharger, the exhaust gases pass through a turbine of the dilution turbocharger that extracts heat energy from the exhaust gases and converts it into work used to power a compressor of the dilution turbocharger. The compressor may generate a stream of pressurized air that is used to dilute the exhaust gases. The stream of pressurized air may be cooled by a secondary charge air cooler, thereby reducing the temperature of the exhaust gases. A reduction or an increase in the temperature of the exhaust gases may be controlled via the actuation of one or more valves disposed on the exhaust passage, such as a exhaust gas dilution valve and a dilution bypass valve. By actuating the exhaust gas dilution valve and the dilution bypass valve to various different positions, an amount of energy extracted from the exhaust gases and an amount of air diluting the exhaust gases may be controlled in response to a measurement of the temperature of the exhaust gases at an inlet of the SCR system, for example, by an exhaust gas temperature sensor. In this way, the temperature of the exhaust gases may be maintained within a range of temperatures at which catalytic conversion (e.g., NOx conversion) within the SCR system is most efficient. By increasing the efficiency of the catalytic conversion, an amount of emissions generated by the engine may be minimized. Additionally, the engine may not have to be derated due to excessive exhaust gas temperatures, leading to an improved performance of the engine. In other embodiments, a similar reduction in temperature may be achieved by replacing the dilution turbocharger with an air pump, or by routing pressurized air generated at a primary turbocharger and cooled by a primary charge air cooler to an exhaust passage upstream of the SCR system, so that the cooled, pressurized air may be injected into the exhaust gases.

The disclosure also provides support for a method for controlling a temperature of exhaust gases entering a Selective Catalytic Reduction (SCR) system for an engine, comprising: delivering pressurized air into the exhaust gases upstream of the SCR system, the pressurized air cooled by an air cooler, and adjusting a degree of pressurization by adjusting operation of a turbocharger pressurizing the pressurized air. In a first example of the method, delivering the pressurized air into the exhaust gases further comprises injecting the pressurized air into the exhaust gases in response to the temperature of the exhaust gases increasing above a peak efficiency threshold temperature. In a second example of the method, optionally including the first example, the peak efficiency threshold temperature is a temperature at which a NOx conversion rate is maximized. In a third example of the method, optionally including one or both of the first and second examples, the method further comprises: controlling the injecting of the pressurized air into the exhaust gases via an exhaust gas dilution valve disposed on an exhaust line downstream of the air cooler. In a fourth example of the method, optionally including one or more or each of the first through third examples, the turbocharger is a primary turbocharger of the engine, and the pressurized air is pressurized by an engine air intake compressor of the primary turbocharger, the engine air intake compressor routing the pressurized air through a primary charge air cooler to both of an intake manifold of the engine and the SCR system. In a fifth example of the method, optionally including one or more or each of the first through fourth examples, the air cooler is a secondary charge air cooler different from the primary charge air cooler. In a sixth example of the method, optionally including one or more or each of the first through fifth examples, the method further comprises: pressurizing the pressurized air injected into the exhaust gases via a dilution compressor of a secondary, exhaust gas dilution turbocharger, the dilution compressor coupled to a dilution turbine of the exhaust gas dilution turbocharger, the dilution turbine positioned downstream of a primary exhaust turbine of the primary turbocharger, the primary exhaust turbine driving the engine air intake compressor and the dilution turbine driving the dilution compressor. In a seventh example of the method, optionally including one or more or each of the first through sixth examples, the method further comprises: in a first condition, where the temperature of the exhaust gases exceeds the peak efficiency threshold temperature, routing exhaust gases exiting the primary exhaust turbine through the dilution turbine to drive the dilution compressor and inject the pressurized air into the exhaust gases, and in a second condition, where the temperature of the exhaust gases is below the peak efficiency threshold temperature, not routing the exhaust gases exiting the primary exhaust turbine through the dilution turbine, and routing the exhaust gases to the SCR system via a dilution turbine bypass line. In an eighth example of the method, optionally including one or more or each of the first through seventh examples, routing the exhaust gases exiting the primary exhaust turbine through the dilution turbine further comprises actuating at least one of the exhaust gas dilution valve and a dilution bypass valve disposed on the dilution turbine bypass line to route a portion of the exhaust gases through the dilution turbine. In a ninth example of the method, optionally including one or more or each of the first through eighth examples, actuating the at least one of the exhaust gas dilution valve and the dilution bypass valve further comprises actuating the exhaust gas dilution valve and the dilution bypass valve in conjunction to achieve at least one of a desired dilution of the exhaust gases with the pressurized air and a desired speed of an airflow of the exhaust gases through the SCR system, the desired dilution and the desired speed based on a desired temperature of the exhaust gases at the SCR system. In a tenth example of the method, optionally including one or more or each of the first through ninth examples, the desired temperature of the exhaust gases at the SCR system is measured by an exhaust gas temperature sensor arranged at an inlet of the SCR system. In a eleventh example of the method, optionally including one or more or each of the first through tenth examples, actuating the exhaust gas dilution valve and the dilution bypass valve in conjunction to achieve the desired dilution and the desired speed further comprises: in response to the temperature of the exhaust gases being greater than the peak efficiency threshold temperature, actuating the dilution bypass valve to a more closed position and actuating the exhaust gas dilution valve to a more open position, to increase a dilution and a speed of the exhaust gases, and in response to the temperature of the exhaust gases being less than the peak efficiency threshold temperature, actuating the dilution bypass valve to an open position and actuating the dilution valve to a closed position, to decrease the dilution and speed of the exhaust gases.

The disclosure also provides support for an engine system, comprising: a controller including a processor and instructions stored in a memory of the controller that when executed cause the controller to: prior to routing exhaust gases of the engine system into a Selective Catalytic Reduction (SCR) system disposed at an outlet of an exhaust passage: responsive to a temperature of the exhaust gases increasing above a peak efficiency threshold temperature, adjusting an exhaust gas dilution valve disposed on the exhaust passage to a more open position to flow pressurized air into the exhaust gases through a charge air cooler positioned upstream of the SCR system, and responsive to the temperature of the exhaust gases being less than the peak efficiency threshold temperature, adjusting the exhaust gas dilution valve to a more closed position to decrease the flow of pressurized air into the exhaust gases. In a first example of the system, the pressurized air is pressurized by one of: an engine air intake compressor of a primary turbocharger of the engine system, the engine air intake compressor delivering the pressurized air to an engine of the engine system, an air pump powered by one of the engine and a battery of the engine system, and a dilution compressor of a secondary, exhaust gas dilution turbocharger of the engine system, the dilution compressor mechanically coupled to a dilution turbine of the exhaust gas dilution turbocharger, the dilution compressor powered by exhaust gases flowing through the dilution turbine.

The disclosure also provides support for an engine system, comprising: an exhaust gas dilution turbocharger disposed on an exhaust passage of an engine of the engine system, the exhaust gas dilution turbocharger comprising a dilution compressor and a dilution turbine coupled to the dilution compressor, and a controller including a processor and instructions stored in a memory of the controller that when executed cause the controller to: prior to routing exhaust gases of the engine into a Selective Catalytic Reduction (SCR) system disposed at an outlet of the exhaust passage: responsive to a temperature of the exhaust gases increasing above a peak efficiency threshold temperature, dilute the exhaust gases with air pressurized by the dilution compressor, the dilution compressor driven by routing a portion of the exhaust gases through the dilution turbine, and responsive to the temperature of the exhaust gases being less than the peak efficiency threshold temperature, route the exhaust gases into a dilution turbine bypass line bypassing the dilution turbine. In a first example of the system, the peak efficiency threshold temperature is a temperature at which an NOx conversion rate of the SCR system is maximized. In a second example of the system, optionally including the first example, the system further comprises: a charge air cooler disposed on the exhaust passage downstream of the dilution compressor, wherein the pressurized air generated by the dilution compressor is routed through the charge air cooler prior to diluting the exhaust gases. In a third example of the system, optionally including one or both of the first and second examples, routing the portion of the exhaust gases through the dilution turbine to dilute the exhaust gases with pressurized air further comprises actuating a dilution bypass valve disposed on the dilution turbine bypass line and an exhaust gas dilution valve disposed on the exhaust passage to a first configuration, the first configuration directing the portion of the exhaust gases through the dilution turbine, and wherein routing the exhaust gases into the dilution turbine bypass line bypassing the dilution turbine further comprises actuating the dilution bypass valve and the exhaust gas dilution valve to a second configuration, the second configuration routing the exhaust gases into the dilution turbine bypass line. In a fourth example of the system, optionally including one or more or each of the first through third examples, actuating the dilution bypass valve and the exhaust gas dilution valve to the first configuration further comprises actuating the dilution bypass valve to a first position and actuating the exhaust gas dilution valve to a second position, the first position and the second position based on at least one of: a temperature of the pressurized air upon exiting the charge air cooler, a temperature of the exhaust gases in the exhaust passage, a desired mixture of air and exhaust gases at the SCR system, and a desired speed of an airflow of the mixture through the SCR system. In a fifth example of the system, optionally including one or more or each of the first through fourth examples, actuating the dilution bypass valve and the exhaust gas dilution valve to the second configuration to route the exhaust gases into the dilution turbine bypass line further comprises actuating the dilution bypass valve to an open position and actuating the exhaust gas dilution valve to a closed position.

In another representation, a method for controlling a temperature of exhaust gases entering a Selective Catalytic Reduction (SCR) system for an engine comprises delivering pressurized air into the exhaust gases upstream of the SCR system, the pressurized air cooled by an air cooler, and adjusting a degree of pressurization by adjusting a position of an exhaust gas dilution valve disposed on an exhaust line downstream of the air cooler.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a temperature of exhaust gases entering a Selective Catalytic Reduction (SCR) system for an engine, the engine having a turbocharger with a primary turbine coupled in the exhaust and an engine intake compressor coupled in the intake, comprising:
  delivering pressurized air into the exhaust gases upstream of the SCR system, the pressurized air cooled by an air cooler;
  pressurizing the pressurized air injected into the exhaust gases via a dilution compressor of a secondary exhaust gas dilution turbocharger, the dilution compressor coupled to a dilution turbine of the exhaust gas dilution turbocharger, the dilution turbine positioned downstream of a primary exhaust turbine of the primary turbocharger, the dilution turbine driven by exhaust gas, the primary exhaust turbine driving the engine air intake compressor and the dilution turbine driving the dilution compressor; and
  adjusting a degree of pressurization by adjusting operation of a turbocharger pressurizing the pressurized air.

2. The method of claim 1, wherein delivering the pressurized air into the exhaust gases further comprises injecting the pressurized air into the exhaust gases in response to the temperature of the exhaust gases increasing above a peak efficiency threshold temperature.

3. The method of claim 2, wherein the peak efficiency threshold temperature is a temperature at which a NOx conversion efficiency is above a threshold efficiency.

4. The method of claim 1, further comprising controlling the injecting of the pressurized air into the exhaust gases via an exhaust gas dilution valve disposed on an exhaust line downstream of the air cooler, wherein control of the exhaust gas dilution valve is in coordination with a dilution bypass valve bypassing the dilution turbine.

5. The method of claim 4, wherein the turbocharger is a primary turbocharger of the engine, and the pressurized air is pressurized by an engine air intake compressor of the primary turbocharger, the engine air intake compressor routing the pressurized air through a primary charge air cooler to both of an intake manifold of the engine and the SCR system.

6. The method of claim 5, wherein the air cooler is a secondary charge air cooler different from the primary charge air cooler.

7. The method of claim 5, wherein, when exhaust gases reach the peak efficiency threshold temperature, actuating the dilution bypass to a more closed position and the exhaust gas dilution valve to a more open position to route at least a portion of the exhaust gases into the dilution turbine.

8. The method of claim 4, wherein, prior to exhaust gases reaching a peak efficiency threshold temperature, actuating the dilution bypass valve to an open position and the exhaust gas dilution valve to a closed position to allow the exhaust gases to bypass the dilution turbine and be routed to the SCR system without passing through the dilution turbocharger.

9. A method for controlling a temperature of exhaust gases entering a Selective Catalytic Reduction (SCR) system for an engine, comprising:
  delivering pressurized air into the exhaust gases upstream of the SCR system, the pressurized air cooled by an air cooler; and
  adjusting a degree of pressurization by adjusting operation of a turbocharger pressurizing the pressurized air, wherein delivering the pressurized air into the exhaust gases further comprises injecting the pressurized air into the exhaust gases in response to the temperature of the exhaust gases increasing above a peak efficiency threshold temperature, the method further comprising controlling the injecting of the pressurized air into the exhaust gases via an exhaust gas dilution valve disposed on an exhaust line downstream of the air cooler, wherein the turbocharger is a primary turbocharger of the engine, and the pressurized air is pressurized by an engine air intake compressor of the primary turbocharger, the engine air intake compressor routing the pressurized air through a primary charge air cooler to both of an intake manifold of the engine and the SCR system, wherein the air cooler is a secondary charge air cooler different from the primary charge air cooler, and the method further comprising pressurizing the pressurized air injected into the exhaust gases via a dilution compressor of a secondary exhaust gas dilution turbocharger, the dilution compressor coupled to a dilution turbine of the exhaust gas dilution turbocharger, the dilution turbine positioned downstream of a primary exhaust turbine of the primary turbocharger, the primary exhaust turbine driving the engine air intake compressor and the dilution turbine driving the dilution compressor.

10. The method of claim 9, further comprising:
  in a first condition, where the temperature of the exhaust gases exceeds the peak efficiency threshold temperature, routing exhaust gases exiting the primary exhaust turbine through the dilution turbine to drive the dilution compressor and inject the pressurized air into the exhaust gases; and
  in a second condition, where the temperature of the exhaust gases is below the peak efficiency threshold temperature, not routing the exhaust gases exiting the primary exhaust turbine through the dilution turbine, and routing the exhaust gases to the SCR system via a dilution turbine bypass line.

11. The method of claim 10, wherein routing the exhaust gases exiting the primary exhaust turbine through the dilution turbine further comprises actuating at least one of the exhaust gas dilution valve and a dilution bypass valve disposed on the dilution turbine bypass line to route a portion of the exhaust gases through the dilution turbine.

12. The method of claim 11, wherein actuating the at least one of the exhaust gas dilution valve and the dilution bypass valve further comprises actuating the exhaust gas dilution valve and the dilution bypass valve in conjunction to achieve at least one of a desired dilution of the exhaust gases with the pressurized air and a desired speed of an airflow of the exhaust gases through the SCR system, the desired dilution and the desired speed based on a desired temperature of the exhaust gases at the SCR system.

13. The method of claim 12, wherein the desired temperature of the exhaust gases at the SCR system is measured by an exhaust gas temperature sensor arranged at an inlet of the SCR system.

14. The method of claim 12, wherein actuating the exhaust gas dilution valve and the dilution bypass valve in conjunction to achieve the desired dilution and the desired speed further comprises:
  in response to the temperature of the exhaust gases being greater than the peak efficiency threshold temperature, actuating the dilution bypass valve to a more closed position and actuating the exhaust gas dilution valve to a more open position, to increase a dilution and a speed of the exhaust gases; and
  in response to the temperature of the exhaust gases being less than the peak efficiency threshold temperature, actuating the dilution bypass valve to an open position and actuating the dilution valve to a closed position, to decrease the dilution and speed of the exhaust gases.

15. An engine system, comprising:
an exhaust gas dilution turbocharger disposed on an exhaust passage of an engine of the engine system, the exhaust gas dilution turbocharger comprising a dilution compressor and a dilution turbine coupled to the dilution compressor; and
a controller including a processor and instructions stored in a memory of the controller that when executed cause the controller to:
prior to routing exhaust gases of the engine into a Selective Catalytic Reduction (SCR) system disposed at an outlet of the exhaust passage:
responsive to a temperature of the exhaust gases increasing above a peak efficiency threshold temperature, dilute the exhaust gases with air pressurized by the dilution compressor, the dilution compressor driven by routing a portion of the exhaust gases through the dilution turbine, and
responsive to the temperature of the exhaust gases being less than the peak efficiency threshold temperature, route the exhaust gases into a dilution turbine bypass line bypassing the dilution turbine.

16. The system of claim 15, wherein the peak efficiency threshold temperature is a temperature at which an NOx conversion rate of the SCR system is maximized.

17. The engine system of claim 15, further comprising a charge air cooler disposed on the exhaust passage downstream of the dilution compressor, wherein the pressurized air generated by the dilution compressor is routed through the charge air cooler prior to diluting the exhaust gases.

18. The engine system of claim 17, wherein:
routing the portion of the exhaust gases through the dilution turbine to dilute the exhaust gases with pressurized air further comprises actuating a dilution bypass valve disposed on the dilution turbine bypass line and an exhaust gas dilution valve disposed on the exhaust passage to a first configuration, the first configuration directing the portion of the exhaust gases through the dilution turbine; and
routing the exhaust gases into the dilution turbine bypass line bypassing the dilution turbine further comprises actuating the dilution bypass valve and the exhaust gas dilution valve to a second configuration, the second configuration routing the exhaust gases into the dilution turbine bypass line.

19. The engine system of claim 18, wherein actuating the dilution bypass valve and the exhaust gas dilution valve to the first configuration further comprises actuating the dilution bypass valve to a first position and actuating the exhaust gas dilution valve to a second position, the first position and the second position based on at least one of:
a temperature of the pressurized air upon exiting the charge air cooler;
a temperature of the exhaust gases in the exhaust passage;
a desired mixture of air and exhaust gases at the SCR system; and
a desired speed of an airflow of the mixture through the SCR system.

20. The engine system of claim 18, wherein actuating the dilution bypass valve and the exhaust gas dilution valve to the second configuration to route the exhaust gases into the dilution turbine bypass line further comprises actuating the dilution bypass valve to an open position and actuating the exhaust gas dilution valve to a closed position.

* * * * *